(12) United States Patent
Jamison

(10) Patent No.: US 10,104,836 B2
(45) Date of Patent: Oct. 23, 2018

(54) SYSTEMS AND METHODS FOR FORMING GRAPHICAL AND/OR TEXTUAL ELEMENTS ON LAND FOR REMOTE VIEWING

(71) Applicant: John Paul Jamison, Dickerson, MD (US)

(72) Inventor: John Paul Jamison, Dickerson, MD (US)

( * ) Notice: Subject to any disclaimer, the term of this patent is extended or adjusted under 35 U.S.C. 154(b) by 0 days.

(21) Appl. No.: 15/347,895

(22) Filed: Nov. 10, 2016

(65) Prior Publication Data

US 2017/0055433 A1    Mar. 2, 2017

Related U.S. Application Data

(63) Continuation-in-part of application No. PCT/US2015/035353, filed on Jun. 11, 2015.

(60) Provisional application No. 62/010,805, filed on Jun. 11, 2014, provisional application No. 62/019,886, filed on Jul. 2, 2014, provisional application No.
(Continued)

(51) Int. Cl.
| | |
|---|---|
| *A01D 34/00* | (2006.01) |
| *A01C 21/00* | (2006.01) |
| *A01D 41/00* | (2006.01) |
| *G05D 1/00* | (2006.01) |
| *G05D 1/10* | (2006.01) |
| *A01D 41/127* | (2006.01) |

(52) U.S. Cl.
CPC .......... *A01D 34/008* (2013.01); *A01C 21/005* (2013.01); *A01D 41/127* (2013.01); *G05D 1/104* (2013.01); *B64C 2201/123* (2013.01)

(58) Field of Classification Search
CPC ...... A01D 34/00; A01D 41/00; A01D 41/127; A01C 21/00; A01C 21/005; G05D 1/00; G05D 1/104
See application file for complete search history.

(56) References Cited

U.S. PATENT DOCUMENTS

| 6,064,943 A | 5/2000 | Clark, Jr. et al. |
| 6,074,693 A | 6/2000 | Manning |
| (Continued) | | |

FOREIGN PATENT DOCUMENTS

| CN | 101237767 | 8/2008 |
| DE | 102008031314 | 1/2010 |
| (Continued) | | |

*Primary Examiner* — Yonel Beaulieu
(74) *Attorney, Agent, or Firm* — Occhiuti & Rohlicek LLP

(57) ABSTRACT

Disclosed are methods, devices, systems, computer readable media, and other implementations, including methods to form an aerially-viewable approximation of a target image by processing of land (e.g., an agricultural field) based on land data for a land/field and the target image. In an example, a method is provided that includes obtaining field data for a plurality of field portions each associated with respective soil attributes, obtaining a target image to be aerially viewed, and determining for each of the plurality of field portions, based, in part, on the field data and on the target image, an associated respective crop, selected from a plurality of available crops, and a corresponding respective crop density, such that grown crops resulting from planting of the determined associated crop at the corresponding crop density at the each of the plurality of field portions form, when viewed aerially, an approximation of the target image.

14 Claims, 10 Drawing Sheets

Related U.S. Application Data

62/034,769, filed on Aug. 7, 2014, provisional application No. 62/285,898, filed on Nov. 12, 2015, provisional application No. 62/391,914, filed on May 16, 2016, provisional application No. 62/392,680, filed on Jun. 8, 2016.

(56) References Cited

U.S. PATENT DOCUMENTS

| | | | |
|---|---|---|---|
| 6,299,934 | B1 | 10/2001 | Manning |
| 6,330,503 | B1 | 12/2001 | Sharp et al. |
| 6,553,299 | B1 | 4/2003 | Keller et al. |
| 6,553,312 | B2 | 4/2003 | Upadhyaya et al. |
| 8,190,360 | B2 | 5/2012 | Davis |
| 8,291,855 | B2 | 10/2012 | Hoerl, Jr. et al. |
| 8,713,198 | B2 * | 4/2014 | Maloy ................ H04L 61/1541 709/203 |
| 8,768,667 | B2 * | 7/2014 | Lindores ........... G06F 17/30241 703/6 |
| 8,855,937 | B2 * | 10/2014 | Lindores ............ A01L 379/005 702/19 |
| 8,862,285 | B2 | 10/2014 | Wong et al. |
| 9,035,981 | B2 | 5/2015 | Dal Col et al. |
| 9,058,633 | B2 * | 6/2015 | Lindores ................ G06Q 10/06 |
| 9,408,342 | B2 * | 8/2016 | Lindores ........... G06F 17/30241 |
| 9,846,848 | B2 * | 12/2017 | Lindores ................ G06Q 10/06 |
| 2003/0009282 | A1 | 1/2003 | Upadhyaya et al. |
| 2003/0160739 | A1 | 8/2003 | Silic |
| 2005/0055142 | A1 | 3/2005 | McMurtry et al. |
| 2007/0062383 | A1 | 5/2007 | Gazeau et al. |
| 2009/0114738 | A1 | 5/2009 | Annese et al. |
| 2010/0263277 | A1 | 10/2010 | Rico |
| 2013/0124055 | A1 | 5/2013 | Baurer et al. |
| 2013/0197806 | A1 | 8/2013 | Belzer et al. |
| 2014/0012732 | A1 * | 1/2014 | Lindores .............. A01L 379/005 705/37 |
| 2014/0120251 | A1 | 5/2014 | Grimm et al. |
| 2014/0277965 | A1 | 9/2014 | Miller et al. |
| 2016/0232621 | A1 * | 8/2016 | Ethington ........ G06Q 10/06315 |

FOREIGN PATENT DOCUMENTS

| | | |
|---|---|---|
| DE | 102008031315 | 1/2010 |
| EP | 1415523 | 5/2004 |
| EP | 1913806 | 4/2008 |
| WO | 2003/082418 | 10/2003 |
| WO | 2008/065355 | 6/2008 |

* cited by examiner

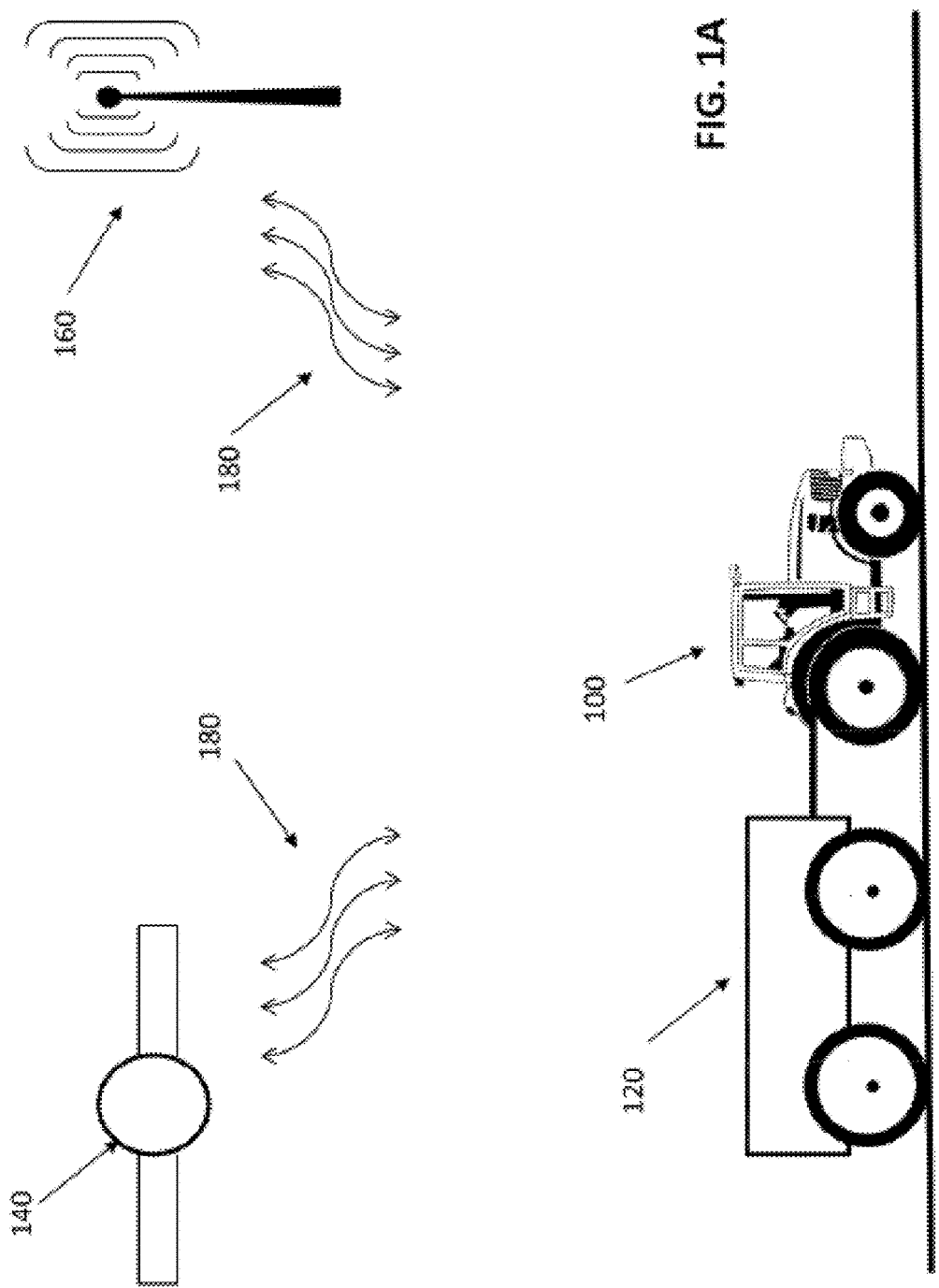

SYSTEMS AND METHODS FOR FORMING GRAPHICAL AND/OR TEXTUAL ELEMENTS ON LAND FOR REMOTE VIEWING

CROSS-REFERENCE TO RELATED APPLICATIONS

This application is a continuation-in-part (CIP) application of, and claims priority to, International Application No. PCT/US2015/035353, entitled "SYSTEMS AND METHODS FOR FORMING GRAPHICAL AND/OR TEXTUAL ELEMENTS ON LAND FOR REMOTE VIEWING," and filed Jun. 11, 2015, which in turn claims the benefit of, and priority to, U.S. Provisional Patent Application No. 62/010,805, filed Jun. 11, 2014, U.S. Provisional Patent Application No. 62/019,886, filed Jul. 2, 2014, and U.S. Provisional Patent Application No. 62/034,769, filed Aug. 7, 2014. The present CIP application also claims priority to U.S. Provisional application No. 62/285,898, entitled "NANOBOT ADVERTISING," filed Nov. 12, 2015, to U.S. Provisional application No. 62/391,914, entitled "METHOD OF PUTTING GRAPHICS ON LANDSCAPES," filed May 16, 2016, and to U.S. Provisional application No. 62/392,680 filed Jun. 8, 2016. The contents of all of the above-identified previously filed applications are incorporated herein by reference in their entireties.

TECHNICAL FIELD

The technical field of the present concepts is agricultural equipment such as, but not limited to, tractors, spreaders, planters, seeders, tillers, plows, mulchers, harrows, cultivators, subsoilers, pulverizers, and the like.

BACKGROUND

U.S. Pat. No. 6,553,299, titled "Methods and apparatus for precision agriculture operations utilizing real time kinematic global positioning system systems," discloses use of global positioning system (GPS) technology to improve accuracy of seeding, cultivating, planting and/or harvesting operations. The GPS systems can be used to control fully or semi-autonomous vehicles in these operations and may allow for precision planting of seeds (e.g., from a seeder equipped with a GPS receiver and related equipment) and/or precision weed removal (e.g., using a vehicle fitted with weed eradication mechanisms such as augers and/or herbicide sprayers), and/or crop harvesting.

U.S. Pat. No. 6,553,312, titled "Method and apparatus for ultra-precise GPS-based mapping of seeds or vegetation during planting" likewise utilizes a GPS receiver with a seeding device to provide an ultra-precise seed planting apparatus and method for generating an accurate map of the location of seeds or vegetation as they are planted.

US 2014/0277965, titled "GPS Planting System" discloses a seed planting system that plants seeds at a precise location within a field to allow for efficient in-row cultivation. The planting system receives a GPS signal, processes that signal to determine the precise time at which to dispense a seed from an agricultural seeder or planter, then generates an actuation signal that is transmitted to the seeder or planter. GPS signals are also processed to steer the seeder or planter so that seeds are properly placed within the field.

Each of the aforementioned patents and published patent application are incorporated herein by reference in its entirety

SUMMARY

In at least some aspects of the present concepts, a computer-implemented method for forming a graphic design (e.g., image(s), text, alphanumeric characters, etc., in any combination) on real property comprises the acts of defining the graphic design to be formed on the real property, scaling the graphic design, or portion thereof, to a designated portion of the real property, and mapping the scaled graphic design, or portion thereof, to the selected portion of the real property, the act of mapping comprising defining a plurality of points on the designated portion of the real property to be altered to form the graphic design. The method also includes the acts of inputting the mapped graphic design, or portion thereof, into a physical, non-transient memory device operatively associated with a navigation system, the navigation system comprising a part of, and providing inputs to, a control system for at least one computer-controlled mechanism, the control system being configured to selectively actuate the at least one computer-controlled mechanism to cause the at least one computer-controlled mechanism to actuate and alter only the plurality of points on the designated portion of the real property or sub-portion thereof and traversing the designated portion of the real property with the at least one computer-controlled mechanism, controlling the at least one computer-controlled mechanism to selectively alter only the plurality of points on the designated portion of the real property or sub-portion thereof. The selective alteration of only the plurality of points on the designated portion of the real property or sub-portion thereof forms the graphic design, or portion thereof, on the designated portion of the real property, either contemporaneously with the act of altering or at a time subsequent thereto. The navigation system may advantageously comprise, for example, a global positioning systems (GPS), Global Navigation Satellite System (GNSS), inertial navigation system (INS), and/or trilateration device(s), or the like. In an INS, for example, a computer, motion sensors (accelerometers) and rotation sensors (gyroscopes), which may be provided as part of an inertial measurement unit (IMU), are used to continuously calculate the position, orientation, and velocity (direction and speed of movement) of a moving object without the need for external references (i.e., GPS is not required, but could advantageously be used in combination with INS to provide error correction at one or more points during navigation). Using an INS, the vehicle 100 and/or computer-controlled mechanism 120 can traverse the real property 200, starting from a known origin point. As the vehicle 100 moves from an origin point, the computer, in combination with the INS, would determine the movement of the tractor relative to the origin point and, further, relative to the map of the real property.

In at least some aspects of the present concepts, a method of sculpting land for non-agricultural purposes is provided and comprises the acts of receiving a representation of an image defined by a first set of points (e.g., cutting plants at the first set of points to a first height) and a second set of points (e.g., cutting plants at the second set of points to a second height), and traversing the surface with a sculpting mechanism operatively associated with a navigation system configured to detect a position of the sculpting mechanism relative to each point in the first set of points and the second set of points. The method also includes, responsive to a location determined by the navigation system, an act of selectively actuating the sculpting mechanism at least the first set of points to perform a first sculpting action to yield, either contemporaneously with the act of selectively actuating the sculpting mechanism or at a later time, different physical characteristics along the surface as between the first set of points and the second set of points. Optionally, the method also includes, responsive to a location determined by the navigation system, an act of selectively actuating the sculpting mechanism at the second set of points to perform a second sculpting action to yield, either contemporaneously with the act of selectively actuating the sculpting mechanism or at a later time, different physical characteristics along the surface as between the first set of points and the second set of points. Optionally, the method includes the act of traversing the surface using a plurality of adjacent paths. The sculpting mechanism is, in at least one other aspect, a mower, a combine, a sod harvester and the act of selective actuation at the first set of points includes actuating the mower at a first height, and the selective actuation at the second set of points includes actuating the mower at a second height. In all of the above aspects, the navigation system may advantageously comprise GPS, GNSS, INS and/or trilateration device(s), or the like. In the above aspects, the sculpting mechanism may alternatively comprise at least one device configured to move soil and the act of selectively actuating the sculpting mechanism at the first set of points or at the second set of points, or both, moves soil at said points so as to yield a physical difference between the first set of points and the second set of points, such physical differences being discernible from at least a remote position relative to the surface. In such aspects, the act of moving soil comprises at least one of removing soil, displacing soil, compacting soil, or admixing soil.

In yet other aspects of the present concepts, a sculpting system comprises a first hopper configured to hold a first seed type, a row unit coupled to the first hopper such that the row unit, responsive to a control system, is adapted to selectively dispense in soil or plant in soil the first seed type, the selective dispersion or planting of the first seed type being controlled by the control system and a locating mechanism configured to detect a position of the row unit so as to cause the row unit to dispense or plant the first seed type only at a first set of points, the first set of points defining at least a portion of a graphic design. In another aspect, the sculpting system further comprises a second hopper configured to hold a second seed type, a row unit coupled to the second hopper such that the row unit, responsive to a control system, is adapted to selectively dispense in soil or plant in soil the second seed type, the selective dispersion or planting of the second seed type being controlled by the control system and a locating mechanism configured to detect a position of the row unit so as to cause the row unit to dispense or plant the second seed type only at a second set of points, the second set of points defining at least a portion of a graphic design. The above concept is not limited to two seed types, hoppers, rows, points, etc. Rather, multiple configurations may be used to increase variation in the graphic design.

In at least some aspects of the present concepts, a method of physically altering real property, the method comprising defining a graphical representation to impart to the real property using at least a first set of points on the property and traversing the real property with a mechanism operatively associated with both a control system and a navigation system configured to detect both a location of the mechanism and a spatial position (e.g., height, etc.) of at least a portion of the mechanism relative to the first set of points. The method also includes, responsive to a location determined by the navigation system, an act of selectively actuating the mechanism, disposed at a first position relative to at least some of the first set of points to perform a first action to yield, contemporaneously with the act of selectively actuating the mechanism (or optionally subsequent thereto), different visual characteristics along the surface as between the first set of points and remaining sets of points to form at least a first portion of the graphical representation. The different visual characteristics may comprise, by way of example, an altered (e.g., lessened or heightened) reflectivity or an altered color. Optionally, the method further includes an act of defining the graphical representation to impart to the real property, using a second set of points, and traversing the real property with a mechanism operatively associated with both the control system and the navigation system configured to detect both a location of the mechanism and a spatial position (e.g., height, etc.) of at least a portion of the mechanism relative to the second set of points. Responsive to a location determined by the navigation system, the method includes an act of selectively actuating the mechanism at the second set of points to perform a second action to yield, contemporaneously with the act of selectively actuating the mechanism (or optionally subsequent thereto), different visual characteristics along the surface as between the second set of points and remaining points of the real property to form at least a second portion of the graphical representation. Optionally, the method includes the act of traversing the surface using a plurality of adjacent paths. The mechanism is, in at least some aspects, an applicator, and the act of selective actuation of the sculpting mechanism includes application of one or more substances (e.g. chemicals, such as herbicides, or nutrients, such as fertilizer, iron or limestone, nanobots, etc.) at each of the first points and/or second points.

In some variations, a computer-implemented method for forming an aerially-viewable graphic on real property is provided. The method includes defining the graphic to be formed on the real property, scaling the graphic, or a portion thereof, to a designated portion of the real property, mapping the scaled graphic, or the portion thereof, to the designated portion of the real property, wherein mapping the scaled graphic includes defining a plurality of points on the designated portion of the real property to be altered to form the graphic, inputting the mapped graphic, or a portion thereof, into a physical, non-transient memory device operatively associated with a navigation system, with the navigation system comprising a part of, and providing inputs to, a control system for at least one computer-controlled mechanism, the control system being configured to selectively actuate at least one computer-controlled mechanism to cause the at least one computer-controlled mechanism to actuate and alter only the plurality of points on the designated portion of the real property or sub-portion thereof. The method further includes traversing the designated portion of the real property with the at least one computer-controlled mechanism, and controlling the at least one computer-controlled mechanism, during the traversing of the designated portion of the real property, to selectively alter only the plurality of points on the designated portion of the real property, or sub-portion thereof, to form the graphic, or the portion thereof, on the designated portion of the real property, either contemporaneously with the act of altering or at a time subsequent thereto.

Embodiments of the method may include at least some of the features described in the present disclosure, including one or more of the following features.

The at least one computer-controlled mechanism may include one or more of, for example, a spreader, planter, seeder, tiller, plow, mulcher, mower, harrow, cultivator, subsoiler, sprayer, nozzle, and/or pulverizer.

Controlling the at least one computer-controlled mechanism to selective alter only the plurality of points on the designated portion of the real property or sub-portion thereof, to form the graphic, or portion thereof, may include using the at least one computer-controlled mechanism to selectively dispense or plant one or more seeds of a first seed type only at the plurality of points on the designated portion of the real property or sub-portion thereof, and wherein the graphic is formed at a time subsequent to the selective dispersing or planting of the seeds of the first seed type.

Mapping the scaled graphic may include defining at least a plurality of first points and a plurality of second points on the designated portion of the real property to be altered to form the graphic, wherein the control system is configured to selectively actuate the at least one computer-controlled mechanism to cause the at least one computer-controlled mechanism to actuate in a first manner to impart a first alteration on only the first plurality of points and to actuate in a second manner to impart a second alteration on only the second plurality of points. Controlling the at least one computer-controlled mechanism may include selectively altering, during the traversing of the designated portion of the real property, only the first plurality of points and the second plurality of points on the designated portion of the real property or sub-portion thereof, to form the graphic, or portion thereof, on the designated portion of the real property, either contemporaneously with the act of altering or at a time subsequent thereto.

The control system is configured to selectively actuate the at least one computer-controlled mechanism to cause the at least one computer-controlled mechanism to selectively dispense or plant one or more seeds of a first seed type only at the plurality of first points on the designated portion of the real property or sub-portion thereof and to selectively dispense or plant one or more seeds of a second seed type only at the plurality of second points on the designated portion of the real property or sub-portion thereof. The act of controlling the at least one computer-controlled mechanism, during the traversing of the designated portion of the real property, causes the at least one computer-controlled mechanism to dispense or plant one or more seeds of a first seed type only at the plurality of first points on the designated portion of the real property or sub-portion thereof and to dispense or plant one or more seeds of a second seed type only at the plurality of second points on the designated portion of the real property or sub-portion thereof to form the graphic, or portion thereof, on the designated portion of the real property, at a time subsequent to the dispersing of or planting of the seeds of the first seed type and the second seed type, wherein the first seed type and the second seed type are different seed types.

The time subsequent to the dispersing of or planting of the seeds of the first seed type and the second seed type may be a time of maturity for at least one of the first seed type and the second seed type.

The at least one computer-controlled mechanism may include a mower, and the act of controlling the at least one computer-controlled mechanism to selectively alter only the first plurality of points and the second plurality of points on the designated portion of the real property or sub-portion thereof, to form the graphic, or portion thereof, on the designated portion of the real property, may include setting the mower to operate at a first height relative to the ground at positions corresponding only to the first plurality of points and setting the mower to operate at a second height relative to the ground at positions corresponding only to the second plurality of points, the first height being different than the second height.

The at least one computer-controlled mechanism may include a tiller or plow, and the act of controlling the at least one computer-controlled mechanism to selectively alter only the first plurality of points and the second plurality of points on the designated portion of the real property or sub-portion thereof, to form the graphic, or portion thereof, on the designated portion of the real property, may include setting the tiller or plow to operate at a first depth relative to the ground at positions corresponding only to the first plurality of points and setting the tiller or plow to operate at a second depth relative to the ground at positions corresponding only to the second plurality of points, the first depth being different than the second depth.

The at least one computer-controlled mechanism comprises a sprayer or nozzle, and the act of controlling the at least one computer-controlled mechanism to selectively alter only the first plurality of points and the second plurality of points on the designated portion of the real property or sub-portion thereof, to form the graphic, or portion thereof, on the designated portion of the real property, may include dispensing a first substance from the sprayer or nozzle at positions corresponding only to the first plurality of points and dispensing a second substance from the sprayer or nozzle at positions corresponding only to the second plurality of points, the first substance being different than the second substance.

The first substance may be a different color than the second substance.

In some variations, an additional method is provided that includes obtaining field data for a plurality of field portions each associated with respective soil attributes, obtaining a target image to be aerially viewed, and determining for each of the plurality of field portions, based, at least in part, on the field data for the plurality of the field portions that are each associated with the respective soil attributes and based on the target image, an associated respective crop, selected from a plurality of available crops, and a corresponding respective crop density, such that grown crops resulting from planting of the determined associated crop at the corresponding crop density at the each of the plurality of field portions form, when viewed aerially, an approximation of the target image.

Embodiments of the additional method may include at least some of the features described in the present disclosure, including at least some of the features described above in relation to the various methods, as well as one or more of the following features.

Determining for the each of the plurality of field portions the associated respective crop and the corresponding respective crop density may include determining for the each of the plurality of field portions the associated respective crop and the corresponding respective crop density that maximize aggregate crop yield in the plurality of field portions, subject to a constraint that the grown crops form, when viewed aerially, the approximation of the target image.

Determining for the each of the plurality of field portions the associated respective crop and the corresponding respective crop density that maximize aggregate crop yield in the plurality of field portions, subject to the constraint that the grown crops form, when viewed aerially, the approximation of the target image may include defining one or more constraints based on one or more of, for example, the field data for the plurality of field portions, available crops, available farming materials, and/or environmental conditions, and performing a linear programming procedure to achieve a maximum aggregate crop yield based on the defined one or more constraints.

Determining for the each of the plurality of field portions the associated respective crop and the corresponding respective crop density may include defining one or more constraints based on one or more of, for example, the field data for the plurality of field portions, available crops, available farming materials, and/or environmental conditions, defining a further constraint that the grown crops form, when viewed aerially, the approximation of the target image, defining one or more objectives, and performing a linear programming procedure to achieve the defined one or more objectives subject to the defined one or more constraints.

Determining for the each of the plurality of field portions the associated respective crop and the corresponding respective crop density may include determining for the each of the plurality of field portions the respective crop density based, at least in part, on the field data, and deriving for the each of the plurality of field portions, based, at least in part, the determined respective crop density for the each of the plurality of field portions, the associated respective crop.

The method may further include scaling the target image based on dimensions associated with the plurality of field portions and a data representative of a vantage point from which the approximation of the target image is aerially viewable.

The method may further include determining locations for one or more seed dispensing units, and actuating the one or more seed dispensing units to cause dispensing of respective crop seeds held in the one or more crop dispensing units based on the determined respective crop and the corresponding respective crop density at particular ones or the plurality of field portions at which the one or more crop dispensing units are determined to be located.

In some variations, a system is provided that includes a seed-planting machine comprising one or more seed dispensing units, and a controller to control actuation of the one or more seed dispensing units. The controller is configured to obtain field data for a plurality of field portions each associated with respective soil attributes, obtain a target image to be aerially viewed, and determine for each of the plurality of field portions, based, at least in part, on the field data for the plurality of the field portions that are each associated with the respective soil attributes, and based on the target image, an associated respective crop, selected from a plurality of available crops, and a corresponding respective crop density, such that grown crops resulting from planting of the determined associated crop at the corresponding crop density at the each of the plurality of field portions form, when viewed aerially, an approximation of the target image.

Embodiments of the system may include at least some of the features described in the present disclosure, including at least some of the features described above in relation to the various methods, as well as one or more of the following features.

The system may further include one or more communication modules to receive wireless signals. The controller may further be configured to determine locations for the one or more seed dispensing units based, at least in part, location data determined from the received wireless signals, and actuate the one or more seed dispensing units to cause dispensing of respective crop seeds held in the one or more seed dispensing units based on the determined respective crop and the corresponding respective crop density at particular ones of the plurality of field portions at which the one or more crop dispensing units are determined to be located.

The controller configured to determine for the each of the plurality of field portions the associated respective crop and the corresponding respective crop density may be configured to define one or more constraints based on one or more of, for example, the field data for the plurality of field portions, available crops, available farming materials, and/or environmental conditions, define a further constraint that the grown crops form, when viewed aerially, the approximation of the target image, define one or more objectives, and perform a linear programming procedure to achieve the defined one or more objectives subject to the defined one or more constraints.

In some variations, another further system is provided, The system includes a plurality of drones, and one or more processor-based devices to control the plurality of drones, the one or more processor-based devices configured to obtain a target image to be viewed from a pre-determined vantage point, and determine for each of the plurality of drones, based, at least in part, on the target image, a spatial position to place the each of the plurality of drones, and light behavior for light emitted from the each of the plurality of drones, such that a collective light behavior of a resulting arrangement of the plurality of drones forms, when viewed from the pre-determined vantage point, an approximation of the target image.

Embodiments of the additional system may include at least some of the features described in the present disclosure, including at least some of the features described above in relation to the methods and the first system.

It is to be understood that both the preceding summary and the following detailed description are exemplary and explanatory and are intended to provide further explanation of aspects of the present concepts. Neither the summary nor the description that follows is intended to define or limit the scope of the invention to the particular combinations of features disclosed and it is to be understood that any of the aspects disclosed may be used in any combination without limitation.

Details of one or more implementations are set forth in the accompanying drawings and in the description below. Further features, aspects, and advantages will become apparent from the description, the drawings, and the claims.

BRIEF DESCRIPTION OF THE DRAWINGS

FIG. 1A is a representation of at least some aspects of the present concepts.

Like reference symbols in the various drawings indicate like elements.

DESCRIPTION

Figure 1B:
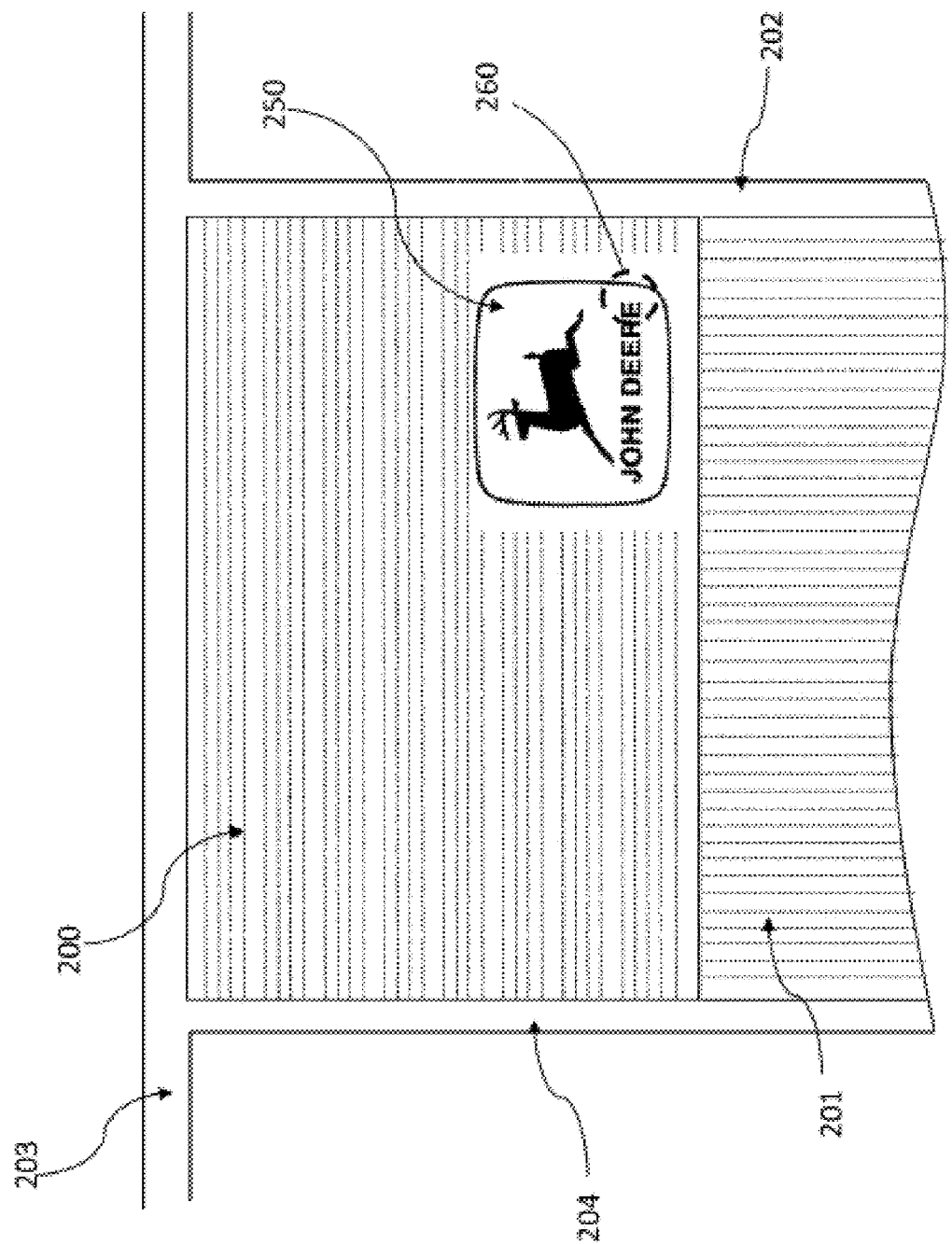
FIG. 1B is a representation of at least some other aspects of the present concepts showing, in particular, an example of a large-scale graphic applied to real property.

Disclosed herein are method, systems, devices, media, and other implementation, for sculpting land into designs for aerial viewing, including a computer-implemented method for forming an aerially-viewable graphic on real property, with the method including defining the graphic to be formed on the real property, scaling the graphic, or a portion thereof, to a designated portion of the real property, and mapping the scaled graphic, or the portion thereof, to the designated portion of the real property, with mapping the scaled graphic including defining a plurality of points on the designated portion of the real property to be altered (e.g., agriculturally processed) to form the graphic. The method further includes inputting the mapped graphic, or a portion thereof, into a physical, non-transient memory device operatively associated with a navigation system, the navigation system including a part of, and providing inputs to, a control system for at least one computer-controlled mechanism (e.g., an agricultural vehicle bearing at least one of a spreader, planter, seeder, tiller, plow, mulcher, harrow, cultivator, subsoiler, sprayer, nozzle, and/or pulverizer), with the control system being configured to selectively actuate at least one computer-controlled mechanism to cause the at least one computer-controlled mechanism to actuate and alter only the plurality of points on the designated portion of the real property or sub-portion thereof, traversing the designated portion of the real property with the at least one computer-controlled mechanism, and controlling the at least one computer-controlled mechanism, during the traversing of the designated portion of the real property, to selectively alter only the plurality of points on the designated portion of the real property, or sub-portion thereof, to form the graphic, or the portion thereof, on the designated portion of the real property, either contemporaneously with the act of altering or at a time subsequent thereto.

In some embodiments, methods, systems, devices, media, and other implementations are provided to maximize a field's potential while forming an aerially-viewable image through utilization of variable rate agriculture for cost savings, utilization of multi-hybrid techniques to increase the yield by placing correct seeds in the correct soil area (while obtaining the desired aerially-viewable image), or using both techniques in order to lower input costs and get a yield boost simultaneously. Thus, an aerially-viewable image could be formed using variable rate methods and/or multi-hybrid methods (e.g., deriving or crop density, also referred to as crop population, for a particularly selected crop, for each of a plurality of field portions, that result in the formation of the target aerially-viewable image). Additionally, in some embodiments, crop yield maximization, or some other objective, could be used to derive the crop type and crop yield for each of the area portions constituting the field/land to be farmed. The size, or resolution, of the areas with respect to which individual determination of crop selection and crop density are computed, can also be controlled/varied; the determination of crop and density can be performed for area portions with sizes of 1 $ft^2$, 4 $ft^2$, 10 $ft^2$, or any other area size/resolution. Thus, in such embodiments, a method is provided that includes obtaining field data for a plurality of field portions each associated with respective soil attributes, obtaining a target image to be aerially viewed, and determining for each of the plurality of field portions, based, at least in part, on the field data for the plurality of the field portions that are each associated with the respective soil attributes and based on the target image, an associated respective crop, selected from a plurality of available crops, and a corresponding respective crop density, such that grown crops resulting from planting of the determined associated crop at the corresponding crop density at the each of the plurality of field portions form, when viewed aerially, an approximation of the target image. In some embodiments, the method may further include determining locations for one or more seed dispensing units, and actuating the one or more seed dispensing units to cause dispensing of respective crop seeds held in the one or more crop dispensing units based on the determined respective crop and the corresponding respective crop density at particular ones or the plurality of field portions at which the one or more crop dispensing units are determined to be located.

As will be discussed in greater details below, in an example implementation, field data for a field area is obtained (based on previously performed soil measurements, based on almanac/historical data available from various sources, such as electronic databased accessible via public or private networks), and a planting prescription for variable rate planting is first determined (i.e., the density of crops for at least some of a plurality of area portions) based, for example, on field attributes and/or other environmental attributes (climate, temperature, and so on). Subsequently, a multi hybrid prescription can be determined for the plurality of fields, using the now determined variable rates for each of the plurality of fields, so as to form the aerially-viewable image. The population would vary depending on the area (determined in the multi-hybrid prescription operations), but the correct contrasting seeds would be placed to form the aerially-viewable image as well. In some embodiments, selection of the crop type (e.g., during the multi-hybrid prescription derivation) may be performed to achieve an objective (such as crop yield maximization).

Also described herein are methods and systems for the use of small robots configured to emit light, reflect light, or take shape, in order to produce an image or a graphic. Such implementations could be used to advertise on several different mediums. For instance, nanobots could swarm or climb trees in order to produce an image to a viewer. These nanobots would get their bearings from GPS, proximity sensors, predetermined locales, or any space-time location determination method or device. The nanobots could be programmed to produce images, and could get their energy from the sun or other sources. The nanobots may be configured to climb, crawl, fly or swim to their location, and could be positioned over stadiums, replacing modern blimps. The bots could resemble or even enhance seasonal decorations. As will be discussed in greater detail below, in some embodiments, a nanobot could be structured so as to resemble different types of insects or animals. Solar powered locust-like nanobots could swarm to create a cloud in which they emit light to produce an image. A solar powered spider-like nanobot could climb a surface and emit light through one of many surfaces like an LED. A small plankton-like nanobot could either emit or reflect light and harvest its energy in many different ways. These bots (drones/ robots) would either take direction or be pre-programmed to produce a legible image (not restricted to legible images). Thus, location-determination implementations may be combined with light emitting/reflecting nanobots to produce images.

The disclosure provided herein describes one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment.

When a particular feature, structure, or characteristic is described in connection with an embodiment, persons skilled in the art may effect such feature, structure, or characteristic in connection with other embodiments, whether or not explicitly described.

For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation." Additionally, the singular terms "a," "an," and "the" include plural referents unless context clearly indicates otherwise.

The embodiments described, and their detailed construction and elements, are merely provided to assist in a comprehensive understanding of the invention. Thus, it is apparent that the present disclosure can be carried out in a variety of ways, and does not require any of the specific features described herein. Also, well-known functions or constructions are not described in detail since they would obscure the disclosure with unnecessary detail.

As used herein, "seed(s)" encompasses all crops, species, varieties, hybrids, plantings, shoots, roots, cuttings, ribosomes, any plant material used as a unit of reproduction and, generally, anything that can be sown (including but not limited to all traits, colors, resistance, and any and all modifications to original specie).

As used herein, "plants" comprises all vegetation, whether planted or cultivated by seeds, shoots, ribosome transfer, naturally occurring, and/or other means.

As used herein, "real property" comprises all terrestrial or water surfaces, inclusive of all environments, improvements, or appurtenances thereon.

As used herein, "planting" comprises the placing, dispensing, sowing, broadcasting, or spreading of seeds, shoots, ribosomes, bulbs, plants, fungi, and/or any other vegetation or growing organism within the ground or other growth medium.

As used herein, "equipment" or "mechanism" comprises all tangible items that may be used for said functions discussed herein, including all means for manipulating real property, including but not limited to tractors, spreaders, planters, combines, harvesting mechanisms, seeders, tillers, plows, mulchers, harrowers, cultivators, subsoilers, pulverizers, sprayers, nozzles, rotators, cultipackers, strip tills, seed drills, slurry spreaders, rakes, reapers, bots, nanobots, drones, or any other such implement used or intended to manipulate the real property. As used herein, a "bot" comprises a self-propelled machine (not exclusive of drones), especially one that has some degree of autonomy and that may or may not reproduce, and that may be used to mimic the effects of other processes or agents, such as a fungus, chemical, or insect, to affect a plant. As used herein, "nanobot" comprises a very small, self-propelled machine, especially one that has some degree of autonomy and that may or may not reproduce, and that may be used to mimic the effects of other processes or agents, such as a fungus, chemical, or insect, to affect a plant.

As used herein, "graphics" comprises images, text, designs, drawings, patterns, outlines, figures, landmarks, and any other form of communication, including but not limited to advertising, branding, memorials, art, names, logos, trademarks, pictures, slogans, boundaries, navigational aids, survey markers, etc.

As used herein, "aerial viewing methods," comprises all forms of viewing the images, including but not limited to, low-flying aircraft, high-flying aircraft, cameras, satellites (e.g., Google Maps), space vehicles, drones, balloons, or any other aerial object or apparatus, as well as all individual viewing vantages, including but not limited to, individuals positioned above or laterally to the image (e.g., viewing from a road, platform, stadium, etc.). This application is deemed to cover all images collected, preserved, stored, communicated or transmitted using said aerial viewing methods.

As used herein, "manipulation" comprises all planting, sowing, harvesting, plowing, bulldozing, moving, spraying, painting, chiseling, removal, insertion, trampling, coloring, placing, hydraseeding, or any other form of alteration on real property to create a graphic.

As used herein, "navigation system" comprises all global positioning systems (GPS), global navigation satellite system (GNSS), inertial navigation system (INS), and/or trilateration device(s), or the like.

As used herein, "field data" comprises any data relevant to a field or a crop appurtenant thereto, inclusive of soil data (e.g., macronutrients, nitrogen, phosphorus, sulfur, potassium, calcium, magnesium, pH, organic matter, water level, soil structure, soil type (loam, sandy, silty, clay, peaty, clay loam, sandy loam, silty clay loam, silty loam, etc.), etc.), historical data (e.g., past yields, prior soil data, prior harvest data, varmint or pest damage comprising any and all forms of damage to a crop by wildlife, insects, or the like, etc.) and physical features of the real property (e.g., topography, grade, contours, surface features and sub-surface features (e.g., obstructions, etc.), wet areas, dry areas, etc.). Such information may be obtained from a variety of sources, including but not limited to soil testing, collecting data from equipment, sensors, historical mapping, aerial viewing methods, etc. As used herein, a "point" comprises a particular spot, place, or position in an area, in a space, or on a map, object, or surface.

Systems and methods in accord with the present disclosure can be used to quickly and efficiently create graphics, advantageously viewable from a remote vantage point, without the time investment required for conventional methods utilizing highly labor-intensive tasks such as manually marking out the graphic on the real property. Additionally, systems and methods in accord with the present disclosure advantageously reduce the cost of creating such graphics, relative to such conventional methods, such as the cost of wasted seed (e.g., seed that is planted and later destroyed to create the graphic), the cost of fuel for additional passes through a field (e.g., to mow down or flatten the unwanted areas of the graphic) and, of course, the time differential cost. Further, the systems and methods in accord with the present disclosure can be duplicated one or more times on other fields or over the existing graphic to maintain, alter, or destroy the graphic using the exact coordinates and ensuring a consistent and precise pattern.

These graphics can be used for several purposes. In some embodiments, the graphics are configured to be viewed from overhead or other distant vantage point and such graphics are primarily intended to be viewed by any persons or implements (e.g., cameras, satellites, drones, balloons, or any other aerial object) flying in the airspace over the property (e.g., land and/or water) on which the graphics reside and/or by any persons or implements at a vantage point to the property (e.g., for a graphic on an incline, such as a hill, or in a lower-lying area). These graphics may advantageously be directed to advertising; and the graphics may comprise, by way of example, corporate logos, trademarks, website addresses, or the like to provide an income source to a farmer, property owner, etc., whether during a growing season or outside of a growing season. In other embodiments, the graphics are configured to be used by persons on the ground. Such graphics can be used, for example, to attract visitors to use the land, such as a "corn maze."

Beneficially, systems and methods in accord with at least some aspects of the present disclosure provide for creating these graphics without the need to waste seed by planting and then removing the crop prior to harvest, and/or the need to make multiple plant passes through the field to create and maintain the graphic—including removing the planted crop from the graphic, controlling weeds on the removed portion, and/or planting another type of crop on the removed portion. Moreover, the systems and methods allow a farmer, owner, operator, etc. to create an image with a single pass, permitting such persons to automatically create an image using precise data points. This permits such persons to determine whether an action will be taken at a precise point (e.g. whether to plant seed a, b, c, etc.; whether to plant no seed; whether to mow or harvest a particular point; or whether to dispense a particular substance). This process greatly eliminates human error, provides more precise images, and drastically reduces manual labor exerted in manually creating real property images. A farmer, owner, operator, etc. can load a data image onto software, and all activities contemplated or designed will automatically be taken according to the defined data points and instructions. As noted above, it is contemplated that the graphics can be utilized both for remote viewing (e.g., graphic on a hill visible from afar, a graphic on a field viewable from an airspace above the field, etc.) and/or for ground-based purposes (e.g., a maze).

Figure 3:
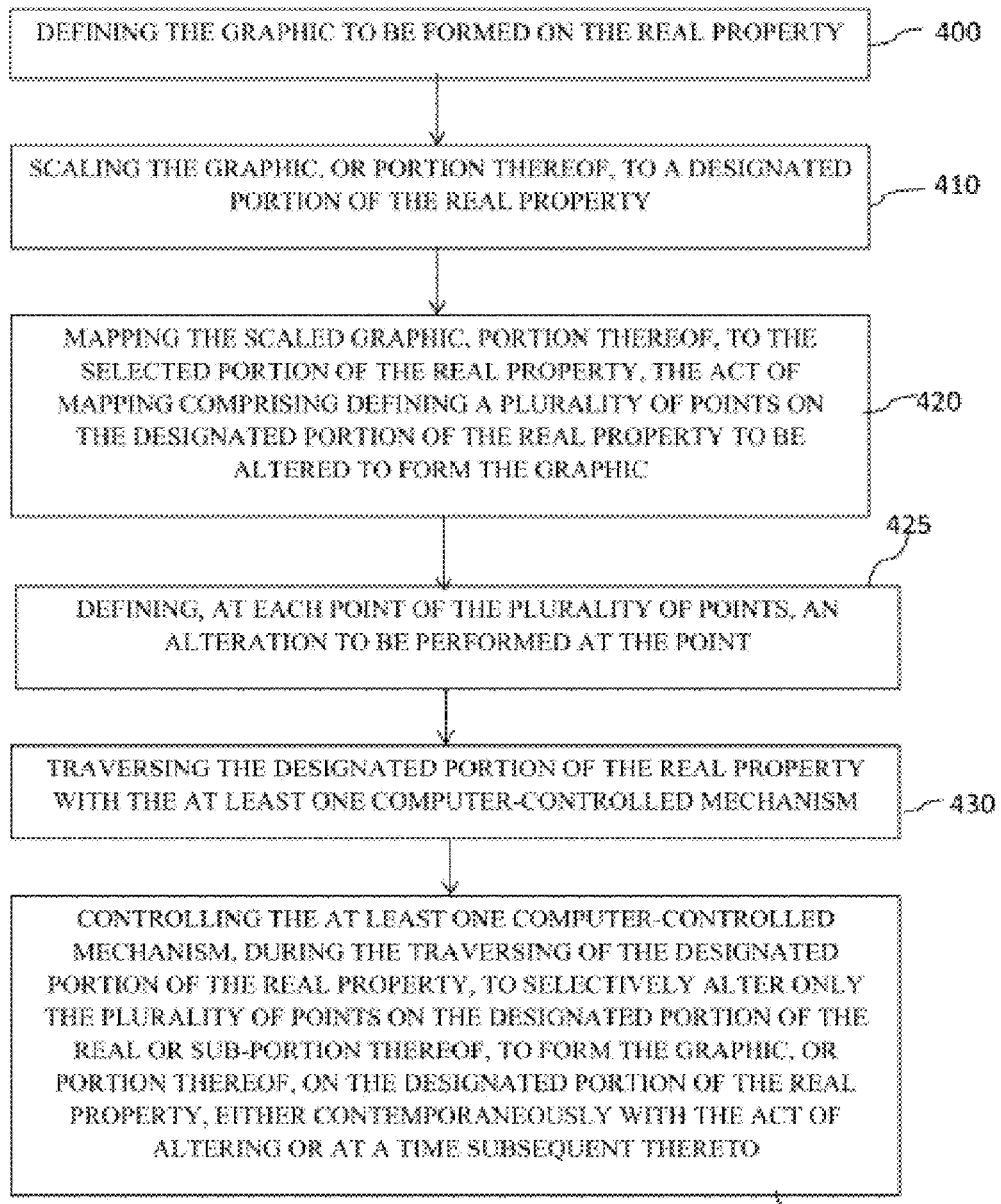
FIG. 3 is a flowchart of one method in accord with an embodiment of aspects of the present concepts.

According to at least some aspects of the present concepts, systems and methods for manipulating real property for non-agricultural purposes include, a computer-implemented method for forming a graphic (e.g., image(s), text, alphanumeric characters, etc., in any combination) or "graphic," as used herein, on real property (inclusive of both bodies of land and/or water) comprising the acts of defining the graphic 250 (see FIG. 1B) to be formed on the real property (see step 400 in FIG. 3) and scaling the graphic, or portion thereof, to a designated portion of the real property (see step 410 in FIG. 3). By way of example, where the graphic is a company trademark, such as is represented in FIG. 1B by reference numeral 250, the act of selecting would correspond to an acceptance by the farmer or land owner of an agreement to form the predetermined graphic 250 (e.g., a company logo, trademark, etc.), or portion thereof, on the real property 200. As another example, a graphic could comprise without limitation a wedding proposal, a political endorsement, a political message, or a personalized message.

Once the graphic 250, or portion thereof, is selected, an appropriate scale for the graphic, or portion thereof, is determined and mapped to the real property 200, or portion thereof, as represented in step 410 of FIG. 3. Stated differently, a vantage point for the desired target audience must be defined (e.g., low flying aircraft, high flying aircraft, cameras, satellites, drones, balloons, or any other aerial object; passers-by on a nearby highway, etc.) and the graphic 250 scale selected to reach such target audience at such vantage point.

Figure 1C:
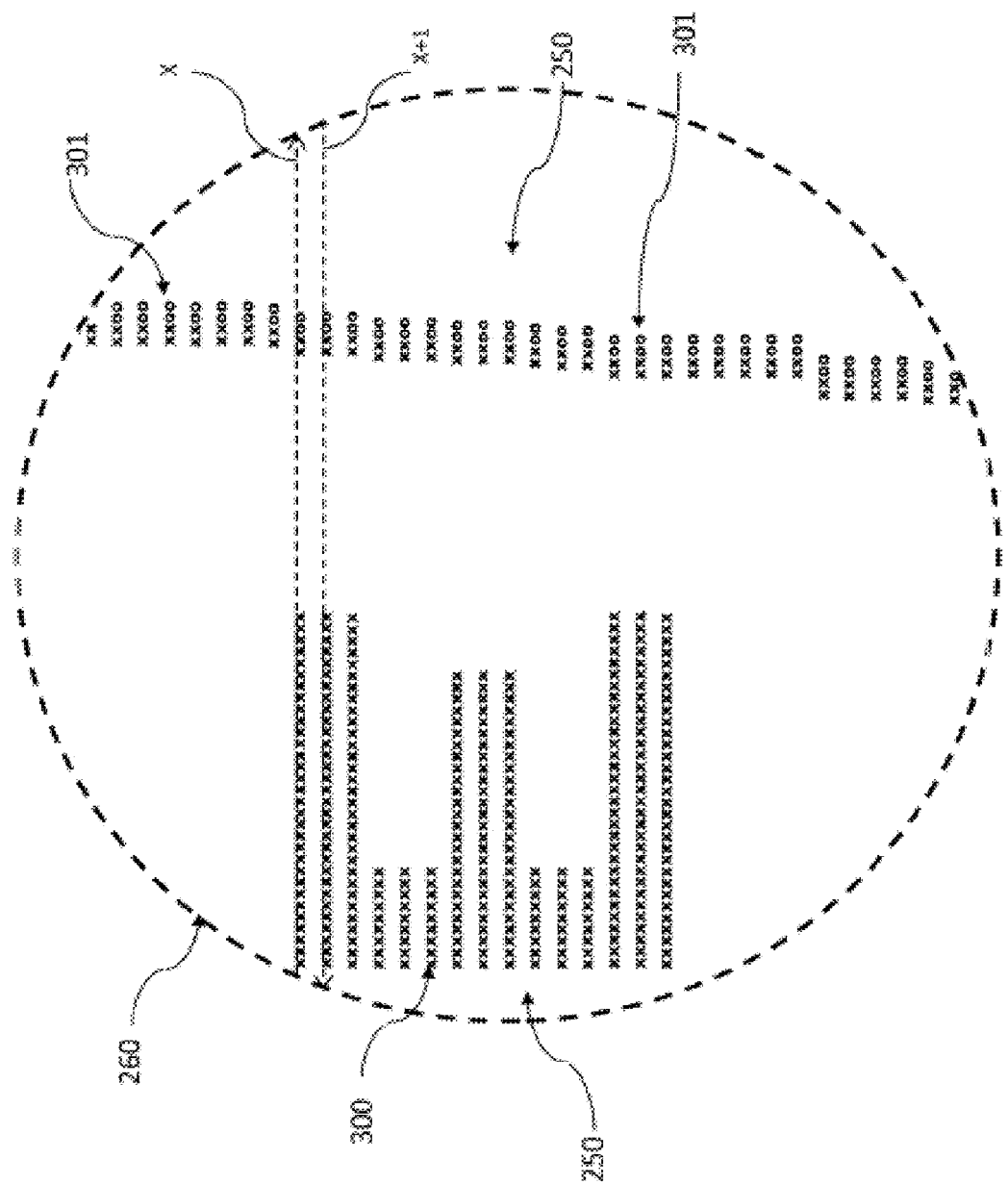
FIG. 1C is a representation of at least some other aspects of the present concepts showing, in particular, an enhanced representation of a portion of the large-scale graphic applied to real property of FIG. 1B.

Once the graphic 250 and scale are determined (see, e.g., FIG. 1B), the graphic can be mapped to the real property 200, or portion thereof (see step 420 in FIG. 3), as a plurality of points 300, 301 on the designated portion of the real property to be altered to form the graphic (see, e.g., FIG. 1C). The method includes the act of defining, at each point of the plurality of points, an alteration to be performed at the point. It is to be understood that each of the N points defining the graphic 250, where N represents any integer, may be individually defined and mapped to a particular alteration (see step 425 in FIG. 3). In the illustrated example of FIG. 1C, the N points defining the graphic 250 comprise two subgroups of alterations (e.g., two different seed types to be planted) represented by the sets of points 300, 301.

Figure 2:
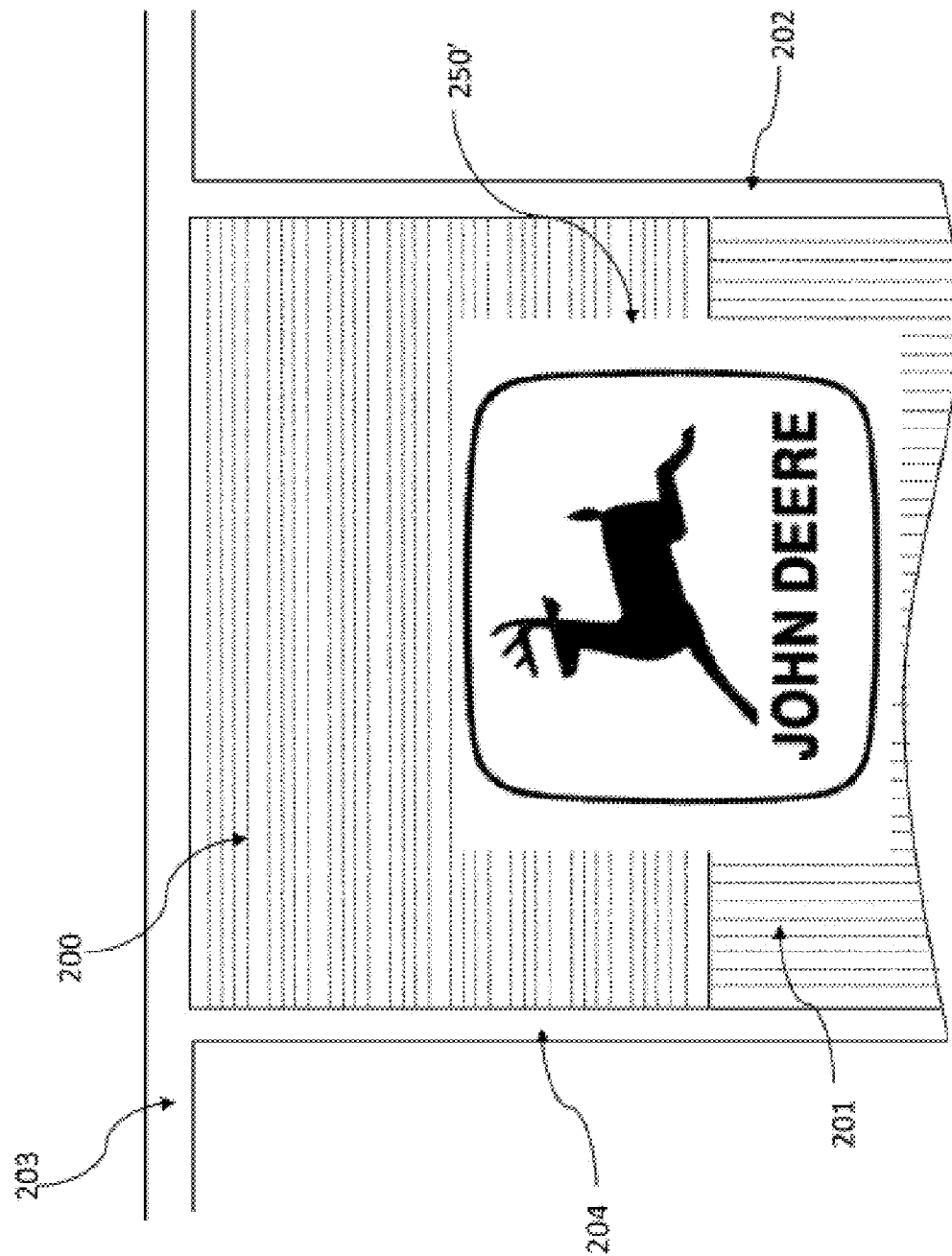
FIG. 2 is a representation of at least some other aspects of the present concepts showing, in particular, an example of a large-scale graphic applied to two adjoining tracts of real property.

The real property 200 is shown in FIGS. 1B and 2 to be bounded by a road 203 on the top (e.g., North), road 204 on the left (e.g., West), road 202 on the right (e.g., East) and real property 201 on the bottom (e.g., South). As is shown in FIG. 1C, the graphic 250 itself is defined by a plurality of sub-regions or points (e.g., 300, 301, etc.) which each are individually defined as a sub-part of the overall graphic. The graphic 250 may be defined by a single type of point (e.g., a single variety of plant), so as to present a visually uniform graphic, or may comprise a plurality of sub-regions or points (e.g., 300, 301, etc.) which each are individually defined as a sub-part of the overall graphic to present a more visually complex graphic. The plurality of sub-regions or points may comprise a uniform element (e.g., a single species, type, hybrid, or color of crop or vegetation at a common level of maturity, etc.) or a plurality of different elements (e.g., two or more different species, types, hybrids, or colors of crop at a common level of maturity or at different levels or maturity, etc.). FIG. 1C illustrates an example wherein the plurality of sub-regions or points comprise a first type of sub-region or point 300 (represented by "x") and a second type of sub-region or point 301 (represented by "o"), wherein the first and second type of sub-regions or points 300, 301 are (or will be) visually distinct to provide, at a desired time (e.g., upon maturity of planted vegetation or crop), the graphic 250. The sub-regions or points (e.g., 300, 301) can assume any size (e.g., square inches, feet, yards, etc.) and will generally correspond in size to the graphic 250 and to the desired resolution from the envisaged vantage points of the viewers.

Advantageously, the mapping is performed via a conventional computer system. In general, the computer system includes a bus or other communication mechanism for communicating information, and one or more processors coupled with the bus for processing information. The computer system also includes a main memory (e.g., a random access memory (RAM)) or other dynamic storage device and one or more other read-only memory (ROM) devices or static storage devices (e.g., "computer-readable medium" such as a hard drive, solid state drive, etc.) coupled to the bus for storing and/or retrieving static information and instructions and data to and from the processor(s). The computer system also comprises at least one display device and at least one input device (e.g., keyboard, mouse, etc.) coupled to the computer system bus via conventional I/O port(s). The computer system also advantageously comprises a conventional communication interface coupled to the bus to provide two-way data communication coupling the computer system to a network link or a local network, by way of example. For example, the communication interface may comprise an integrated services digital network (ISDN) card or a modem to provide a data communication connection to a corresponding type of telephone line or a local area network (LAN) card to provide a data communication connection to a compatible LAN. Wireless links may also be implemented. In any such implementation, the communication interface sends and receives electrical, electromagnetic or optical signals that carry digital data streams representing various types of information. The network link typically provides data communication through one or more networks to other data devices. For example, the network link may provide a connection through local network to a host computer or to data equipment operated by an Internet Service Provider (ISP). The ISP in turn provides data communication services through the worldwide packet data communication network ("Internet").

The map of the real property (e.g., an elevation map, etc.) 200 of a surface may be obtained from a variety of known sources including, but not limited to, tractor data, survey data, harvest data, soil samples, or satellite data. A representation of the graphic 250 is then mapped to the real property using, for example, GPS coordinates to define each of the plurality of points of the graphic. This mapping can be performed by a computer system, as noted above, which may comprise, by way of example, a software module installed onto a vehicle computer (e.g., tractor computer, etc.), home laptop, tablet computer, mobile phone, Google Glasses, or the like, and the software and data relating thereto may be resident on such devices, in whole or in part, or may be located remotely, such as on a removable or portable storage device (e.g., flash drive, solid state storage media, etc.) or a remote storage system or device (e.g., Internet storage, cloud storage, etc.). This mapping is translated into a format readable by the control system such that at least one computer-controller mechanism 120 (e.g. planter) will appropriately transfer the graphic 250, or potential for the graphic (i.e., in the form of plants of one or more varieties, species, types, colors, hybrids, etc., in the form of earth-shaping, etc.), to the real property 200. At least one computer-controller mechanism 120 may do this by traversing back and forth across the real property 200 and selectively actuating an implement (e.g., a planter, mower, plow, etc.) at indicated positions.

Once the graphic 250, or portion thereof, has been determined, scaled and mapped to the real property 200 as a set of points (e.g., 300, 301) on the real property that are to be altered, the mapped graphic, or portion thereof, is input into a physical, non-transient memory device operatively associated with a navigation system providing inputs to a control system for at least one computer-controlled mechanism. At least one computer-controlled mechanism may comprise a vehicle and equipment combination (e.g., a vehicle 100 having a computer-controlled mechanism 120 connected thereto, as represented in FIG. 1 A) or may comprise independent equipment (e.g., computer-controlled mechanism 120 has an onboard navigation system and control system independent of any vehicle 100 to which it is attached). The control system for such computer-controlled mechanism may control one or more aspects of at least one computer-controlled mechanism (e.g., a height and pitch of a mower deck, etc.) and may control multiple computer-controlled mechanisms (e.g., a first seeder, a second seeder, a sprayer, etc.) at the same time or at different times (e.g., a seeder and a mower, etc.). In general, the computer-controlled mechanism comprises one or more pieces of agricultural and/or construction equipment (e.g., earth movers) and may advantageously comprise, for example, one or more of a tractor, spreader, planter, seeder, tiller, plow, mulcher, harrow, cultivator, subsoiler, pulverizer, sprayer, nozzle, rotator, cultipacker, strip till, seed drill, slurry spreader, rake, reaper, or any other such implement used or intended to manipulate the real property.

FIG. 1A also shows that information and/or control signals 180 may be wirelessly transmitted to/from the vehicle 100 and/or computer-controlled mechanism 120 from one or more antennas or transponders 160 or a satellite 140 or the like (e.g., a drone, a balloon, etc.). Thus, by way of example, the vehicle 100 (e.g., a tractor as shown) receives GPS information from a GPS satellite 140, and the on-board control system for the computer-controlled mechanism 120 uses the position information to selectively activate and deactivate the computer-controlled mechanism in accord with the concepts disclosed herein to form a graphic 250. In another example, positional data can be transmitted (e.g., RF transmission) by an antenna 160 (and optionally, bi-directionally as between the vehicle 100 and one or more local or remote antenna 160) to localize a position of the vehicle at any moment, to thereby enable the vehicle (and/or computer-controller mechanism 120) to navigate along the real property.

In operation, the control system is configured, in step 440 of FIG. 3, to selectively actuate at least one computer-controlled mechanism (e.g., a computer-controlled mechanism 120, as represented in FIG. 1 A) to cause at least one computer-controlled mechanism to actuate (e.g., a seeder configured to dispense seeds in a predetermined area) and alter (e.g., by seeding and later maturity of the seeds) only the plurality of points (e.g., 300, 301 in FIG. 1C) on the designated portion of the real property 200 or sub-portion thereof, as at least one computer-controlled mechanism traverses or is caused to traverse (e.g., pulled by a tractor, etc.) the designated portion of the real property (step 430 in FIG. 3). An illustrative example of the traversal of the real property 200 is represented in FIG. 1C by the adjacent arrows "X" and "X+1" where the pattern would repeat over at least the real property 200 designated to bear the graphic 250. Of course, the traversal of the real property may occur along any desired path, paths, or sequence. In accord with aspects of the present concepts, the altering may be contemporaneous with the act of traversing, such as with the use of a plow or mower to effect immediate physical changes, or at a time subsequent thereto, such as in the planting of vegetation or crops of one or more species, type, hybrid, color, etc. that later grow to maturity and yield the graphic at a time subsequent to the planting (e.g., during growth or at maturity).

As to the spacing of adjacent points (e.g., 300 in FIG. 1C), it is contemplated that the density of adjacent points can be constant or can vary as needed based on the graphic itself, the graphic intricacy, the seed(s) selected (e.g., differing species, types, hybrids, colors or as influenced by the cross-sectional dimensions of the mature plant), and the anticipating vantage point of the intended target audience.

It is further contemplated that the at least one computer-controlled mechanism (e.g., a mower, etc.) may be optionally selectively-actuated only at portions of the real property corresponding to the graphic 250.

In at least some aspects of the present concepts, the computer-controlled mechanism 120 includes a locating mechanism configured to detect the position of at least a portion of computer-controlled mechanism or component appurtenant thereto with respect to the ground. For example, where the computer-controlled mechanism 120 comprising equipment for working the soil of a field (e.g., plowing, chiseling, disking, planting, etc.), the selective actuation of the computer-controlled mechanism during the traversing of the designated portion of the real property to alter only the plurality of points on the designated portion of the real property or sub-portion thereof, to form the graphic, or portion thereof, can be selectively varied (e.g., depthwise) based on the position on the surface detected by the locating mechanism.

As previously noted, in some embodiments, GPS (Global Positioning System) technology currently used on farm and industrial equipment is used to selectively actuate at least one computer-controlled mechanism 120. For purposes of illustration, a computer-controlled mechanism 120 in accord with at least some aspects of the present concepts may span a swath of land (e.g., an agricultural planter spanning 4, 6, 8, 12, 16 or more rows) and may itself comprise one or more computer-controlled mechanisms for each individual row or for various groupings of rows. Continuing with this example, in a single pass covering 8 rows, eight different computer-controlled mechanism 120 may simultaneously operate in conjunction with the control system and navigation system (e.g., GPS) to alter, as required, points on the 8 rows for each pass, such as by selectively actuating or shutting-off as the computer-controlled mechanism 120 traverses the real property 200. The end result (following growth of and/or maturity of the plants) is a desired graphic 250, such as a picture or maze, formed by the plants grown by the seeds dropped by the planter without regard to the direction or orientation of the pass.

Although many of the above examples refer to the planting of seeds to, in time, yield a desired representation of the graphic 250, other aspects of the present concepts are advantageously applied to non-arable land, such as desert or bare dirt, snow, grass, forest, or any other terrain or environment. Various implements may be used to sculpt the land to achieve the desired graphic 250. For example, a bulldozer or bulldozer attachment (e.g., to a tractor), a chisel plow with hydraulics to lift or sink individual shanks or gangs of shanks, or other various implements may be used to scar the land and/or move the soil, rocks, and the like to form the desired graphic 250.

The present concepts are particularly suited for "crop circle advertising" and can also aid in the production of a maze (such as a corn maze) by saving seed and time. Whereas current mazes are planted and then cut, the present concepts omit the cutting step and the associated lost yield cost, inputs, land, time and effort. Crop circle advertising may target, for example, an overhead airspace inclusive of cameras, individuals with a viewing vantage, balloons, drones, airplanes and satellites (e.g., Google Maps, satellites, etc.).

As noted above, the scaling of the graphic, in view of a target audience of overhead observes in an airspace above the real property 200, it may be desired to enlarge the graphic 250' to include more than a single plot of land, such as is represented in FIG. 2. In this way, the graphic 250' may then be readily discernible to high altitude or distant aircraft. In such a scenario, two or more fields (e.g., 200, 201 in FIG. 2) are used to each bear a portion of a larger graphic 250'. For example, a group of adjacent land owners may each agree to create a portion of a graphic on a part or all of their land, such that an overall graphic is created when viewed as a whole. In this way, larger graphics can be created in more places. In some embodiments, entire fields are planted with different varieties, seeds and plants to produce a giant graphic 250' formed from many small, differently colored fields or plots of land together make up the overall graphic. In such embodiments, individual row shut off, automatic/manual shut off, multi-seed dispensers, etc. may not necessarily be needed for many graphics or fields because entire fields would be planted with a single color or variety of plant. All that would be required is predetermined coordination of fields in an area. Such embodiments work well but are not limited to, for example, the central and western United States where the grid system of surveying is used. In yet additional aspects, multiple graphics could be used to create a mosaic. Such a mosaic could be created by first creating small graphics that, when added together, combine to create a larger graphic. The smaller graphic may be visible using aerial viewing methods that are closer to the graphic; whereas the larger graphic would be visible using aerial viewing methods at greater distances from the graphic.

In at least some aspects of the present concepts, at least one computer-controlled mechanism 120 is configured to operate autonomously (i.e., unattended) or semi-autonomously (i.e., minimal intervention by a local or remote operator) based on the GPS coordinates or inertial control system. The path by which at least one computer-controlled mechanism 120 traverses the real property (e.g., 200, 201, etc.), such as the pattern represented by the arrows in FIG. 1C, may be preselected in accord with any controlling factors (e.g., at least one computer-controlled mechanism 120 may traverse the real property in a circular pattern to possibly follow irrigation systems). In other aspects, at least one computer-controlled mechanism 120 may plant rows in circular patterns while traveling linearly back and forth as shown in FIG. 1C, by selective actuation of the planter at appropriate times.

For a thickening effect, crops/plants may be planted at various angles. This is currently done on corn mazes in order to hide the rows. Planting is done straight and then across, so that people in the maze cannot see down the row due to the spacing between adjacent plants. The design of the field may be done in this way by simply setting the same boundaries in the same place and then operating the machine or communicating to it to plant across at an angle, for example a ninety degree angle, to what was already planted. Beneficially, the areas can be selectively thickened such that view down the rows is obscured from people within the maze while saving seed by not thickening areas of the graphic that are distal openings in the rows.

In embodiments, at least one computer-controlled mechanism 120 may include a mower that utilizes an individual mower blade shut-off in order to cut a graphic into grass. In embodiments, the mower may have many small blades and hydraulic motors with nitrogen accumulators for the shock of constant off and on. In this way, a larger mower may be used that covers the land and completes the graphic in fewer passes. The mower may alternatively or partially be a sickle bar mower, such as that used on a combine, with at least one roller that comes out in front of each, or multiple, cutter units in order to roll the material that is not meant to be cut under the cutter, which then will pop back up. Such an embodiment has few moving parts, no inertia shock or clutching, utilizes widely used farm machinery, and achieves a good result.

As to embodiments of the present concepts that utilize agricultural sprayers, nozzles, irrigation systems, and the like, as at least one computer-controlled mechanism 120, the control system therefore can utilize the graphic 250 points (e.g., 300) to activate or deactivate, as appropriate, a sprayer (e.g., turning on or off a discharge for a colorant (e.g., a dye) or paint, turning on or off a discharge for a fertilizer, turning on or off a discharge for chemicals). These concepts provide a significant advantage over conventional systems and methods for creating graphics, mazes, and crop circles. A sprayer itself may create the graphic on the land, for example, by selectively fertilizing, or applying chemicals or other agents, only the parts of the land intended to be part of the graphic 250.

Some planters have seed units on wider rows and they also have smaller units that drop between them and split the row for more narrowly-planted plants. In some embodiments, a similar set-up may be used with two (or more) seed types. Two or more varieties of the same plant may thus be changed rapidly in order to not waste space of unplanted arable ground, yet still achieve the contrast needed to achieve a desired graphic 250 (e.g., for crop circle advertising).

Many seeds and plants may be modified according to one of many characteristics to yield a different result (e.g., a plant with a different color, size, soil performance). Embodiments may have two or more grain hoppers that can meter to different units according to what a computer tells them. Thus, there is no need to shut off individual meters; instead, the variety being planted can automatically be changed "on the go." Special meters may be used in such embodiments.

Where existing varieties do not provide the desired colors or other characteristics for a desired graphic, within other constraints such as economic desirability of certain types of crops in certain areas, or suitability of certain plants for certain climates, seasons, terrain, geographic areas, etc., seed may be genetically modified to provide the desired colors and/or other characteristics. For instance, the genetic code of bluegrass may be analyzed to determine the genes giving its blue hue and then those genes may be implanted into the current seed, for example using a virus to change the existing genetic code. This method may be used for color variations across the entire spectrum, for example different varieties of seed may be genetically modified to produce a red pigment, a yellow pigment, a blend of yellow and red pigment, etc. by this method. Selective breeding may be used as an alternative to genetic modification and direct insertion of genetic material.

Different parts of a plant may be color-modified for contrast at different cycles of growth. For instance, during maturation, corn is generally green in color. As the corn matures, a tassel emerges from the top of the stalk and is generally what is seen from the air. Generally, the tassel is yellow in color. When the corn is mature, the stalk dries into a generally golden or yellow color. Beneficially, natural differences can be used to show contrast or alter the graphic as the corn matures. Rates of maturation and shades of stalk color differ between varieties of corn. For example, varieties of corn can be selected to show one graphic based on the different shades of green while growing, another graphic when earlier-maturing corn tassels while the later-maturing corn has not, yet another graphic when early-drying corn dries while later-drying corn remains green, and still yet another graphic when later-drying corn dries to a different shade. They may be modified to dry to a dark or light color, etc. This method may be utilized for example to prolong the duration of the advertisement during or after harvesting of the crop, or even to automatically change the graphic during/after the harvest. Beneficially, the contrast between dried stalks may continue after harvest because combine harvesters generally remove only the ears from corn stalks and leave the stalk and leaves in substantially the same location.

Moreover, genetic modification can be used to modify colors expressed during the life cycle of plants. For example, the genetic code of plants may be modified. For instance, the tassel of corn may be modified to show a desired color and/or contrast so that the desired color/contrast is visible from overhead; dried stalks may be modified to show contrast. Further, genes for colors from other organisms can be inserted into the genetic code of a plant to achieve a desired color.

Contrast in a graphic may be achieved in various ways. For example, in some embodiments, contrast may be achieved by blending varieties in an area for a softer contrast or to blend colors. The seed density may also be reduced in some areas to lighten the graphic, i.e. soften the contrast in those areas. Various combinations of these different methods may be used to achieve the desired effect.

In planting mazes, grass may be planted in areas where the maze plant has not been planted. This makes the maze nicer to walk through and reduces mud. Thus, different seeds may be planted within the same area, such as by making one pass and switching between seeds on the fly, by repeated passes each with a different type, etc. In addition, different chemicals, fertilizers and agents may be applied in different areas as well.

Different types of seeds can also be used to enhance the range of possible effects for graphics for overhead or lateral viewing. A graphic for overhead or lateral viewing may be created by layering many different types of seeds. Graphics may be created automatically, by translating a standard electronic graphic into overhead or lateral graphics composes of one or more plant types, in one or more layers.

In at least some aspects of the present concepts, a database of overhead graphics of plants of known varieties is utilized to form an approximation of a visual appearance of the graphic 250 at maturity and at intermediary stages. The images may advantageously be manipulated to better determine where the seeds for each plant should be planted in order for each plant to mature into a plant having approximately the desired appearance in the planned graphic 250.

In some embodiments, the first seed type and the second seed type are different species. For example, the first seed type can be corn seed and the second seed type can be grass seed (e.g., to yield sod). Existing planters are not designed to hold, separate, dispense, plant, or transfer two different types of seeds to be planted in a particular location. Thus, taking a single computer-controlled mechanism 120 comprising a planter and having it do a first pass with corn seed and then manually or automatically substituting grass seed and having it carry out a second pass would not be an expedient or efficient option. A plurality of computer-controlled mechanisms 120 may advantageously be used. A first computer-controlled mechanism 120 (i.e., a first planter configured to plant a first seed type) and a second computer-controlled mechanism 120' (i.e., a second planter configured to plant a second seed type) are both used on the real property 200, either simultaneously in temporally non-intersecting paths and/or sequentially. This advantageously reduces total run time required when many different passes/layers are needed, for example when many different seeds or plants are desired. Multi-seed meters can be designed specifically for dispensing different species of seeds.

Passes of at least one computer-controlled mechanism 120 (i.e., one or more than one computer-controlled mechanism(s) 120) may be conducted sequentially and contemporaneously (e.g., substantially at the same time) or may alternatively be staggered over a period of time (e.g., a week, two weeks, a month, etc.). Such pass staggering may be desirable for utilization reasons, i.e. to leave some equipment available for other purposes; however, staggering is particularly useful when working with a variety of plant types. For example, corn will outgrow soybeans and shade them out and cast shadows that affect the appearance of a resulting graphic for overhead or lateral viewing. Such differences in growing speed are advantageously accounted for in the act of mapping (step 420 in FIG. 3) to optimize the appearance of the graphic 250 not only at maturity of the plants, but also during maturation of the plants, particularly where more than one type of plant is used. In some cases, the staggering may occur over years, for example where slow-growing species are used or where very mature specimens are desired (e.g., large trees).

In some embodiments, one or more computer-controlled mechanism(s) 120 actuate(s) to form layers of an output over a plurality of passes over the same point(s). For example, a computer-controlled mechanism 120 comprising a sprayer or nozzle can spray a colorant, pesticide, dye, chemical, powder or paint one application at a time (e.g., one color at a time) to create an overall final effect. In another example, a computer-controlled mechanism 120 comprising a planter can plant seeds in layers, one at a time (e.g., one color at a time, one variety at a time, etc.), to create an overall intermediate or final effect as the seeds mature. To illustrate, such planter may be loaded with one seed corresponding to one color, make a first pass planting the seed wherever that color is desired according to programming, then be loaded with a second type of seed having a different color and make a second pass to plant that seed wherever that color is desired, reducing the need for modification of a planter or, in the other embodiment noted above, for multiple paint sprayer nozzles. The tractor 100 or other vehicle may be programmed to only traverse and plant (or paint, mark, etc.) the areas where the current color is desired, ignoring the remainder of the planting area and reducing run time. This method may be used with multiple paints and varieties in a paint spraying embodiment. This layering method may also be combined with planters, sprayers, etc. that have the capacity to handle multiple seed types/paint colors on the fly, particularly for desired graphics have large numbers of colors. For very high precision, many different shades of each primary color might be used, for example. A single graphic might have hundreds of colors. Using a planter capable of handling ten seed types at once, such a graphic could be achieved through multiple layered passes through the field where the graphic is desired.

In some embodiments, a graphic may be created while using offensive and defensive hybrids. For example, two offensive hybrids and two defensive hybrids can be used to produce a graphic while increasing overall yield. The offensive and defensive hybrids can be selected in pairs based on coloring such that the pairs appear substantially visually similar when viewing the graphic. Beneficially, this provides for planting offensive and defensive species to produce higher yields, while still providing a graphic that can be designed without regard to the patterns of offensive and defensive hybrids in the field.

In some embodiments, an animated graphic may be created. For example, in areas where wind patterns are generally known, an animated graphic can be created that uses the wind to give an appearance of motion. In the Midwest, these winds are predominantly westerly winds. For example, a graphic including an arrow pointing generally East would appear to move as waves are created by the wind in the direction the arrow points. This would catch viewer's attention more effectively, and draw their attention in that direction. In some embodiments, a 3-D or optical illusion graphic is created, which may also result in the appearance of motion and result in a more visually-striking graphic.

In addition, any color can be achieved on the fly by mixing primary colors. Multiple meters corresponding to each primary color may be run at once, with different meters running at more or less seed population per meter, to adjust the resulting color in a given area. Since multiple meters would be running in a single area, each meter would generally be running at less than normal planting population (unless the desired color is a single primary color). From a distance, the different primary colors of the different plants blend and form a different color based on the relative seed density of each color. Software may figure out on the fly or in advance, after a graphic is loaded, what seed and what meter to run in order to get the desired primary color combination. For instance, three different row units may run different colors in different rows, which are close enough together to blend the adjacent plant colors from a distance, thus eliminating the need to change seed population, or multiple meters may be run in the same row.

It is contemplated that plants may be manipulated to alter their appearance based on known and generally predictable factors. For example, plants could be designed to wither under the daytime sun, creating a different displayed graphics in the morning and the afternoon. Beneficially, this provides for extra graphics that can be targeted to potential viewers based on time, season, moisture level, etc.

Embodiments of the disclosure may be used in areas such as stadiums, performance areas, public venues, or any other real property where aerial viewing methods exist or are possible, for example to spray paint or chalk graphics on sporting fields or to alter plants (e.g., grass, etc.) or objects (e.g., astro-turf, etc.) on the field (e.g., using multiple grass varieties to make graphics, including field markers, sidelines, goal zones, etc.).

When GPS equipment is run near a treeline or other barrier the GPS signal may cut out because it cannot get a signal from the satellites. This may be prevented by downloading a sufficient buffer of information to the vehicle 100 and/or computer-controlled mechanism 120 control system physical, non-transient computer readable media. Alternatively, a transponder or antenna 160 (see FIG. 1A) may be used to provide position data used by the control system (e.g., by trilateralization) to determine position relative to the mapping of the graphic 250 relative to the real property 200.

Other positioning technologies may be used in addition to or instead of the aforementioned navigation systems. Any type of space-time location device may be used in the method to produce a graphic, maze, etc. For example, a locator based on star position, sun position and/or time of year and time of day may be used. Any sufficiently reliable locator technology may be substituted for GPS. A robotic device equipped with a space-time locator that drives a tractor and manually hits switches to achieve the same result, for example, is within the scope of the disclosure although many embodiments with self-driving tractors or other vehicles are envisioned. Various embodiments use software with point placement of seeds or other objects/substances using a space time locator to achieve a graphic on real property.

Beneficially, patterns can be created on water as well. For example, autonomous drones (e.g., balloons) or bots (e.g., robotic devices, insect bots, nanobots, etc.) can be floated on the water, or positioned above the water, such that they form a graphic 250 viewable from an aerial viewing method. These autonomous drones or bots can be fixed colors or can be designed to selectively absorb, reflect, and/or emit light. For example, a graphic can be created by having autonomous drones representing a first set of points that generally absorb light, and autonomous drones representing a second set of points that generally reflect light. It is likewise contemplated that floating or submerged drones or bots could be programmed to or wired to reflect light or emit light to produce images night or day, and may advantageously use solar absorption during the day and light emission at night to provide appropriate contrast. It is contemplated that the refractive index and other physical properties of water may be taken into account while designing the image such that the desired graphic is properly displayed.

With respect to water-borne graphics, similar to the aforementioned land-based examples wherein plants are used to form the graphic 250, water-borne plants may similarly be used to form a graphic utilizing, as a vehicle 100, a water-borne craft.

Drones may similarly be utilized to facilitate painting a graphic on a building appurtenant to the real property 200, or on the real property, in view of the above, or to create the Graphics on Real Property, discussed herein. For example, a drone may bear seeds and may convey them and deposit them in predetermined locations under the control of a navigation-based control system. As another example, architectural drawings for a building on the property could be mapped and devolved into points of interest to permit a drone to autonomously navigate (e.g., using GPS or other navigation system) the exterior of the building and take predetermined actions. For example, such drone could be used to form or tend to a "wall garden," to apply paint, chemicals or agents, or to pressure wash around windows, with each of the areas around the windows being defined by a plurality of sub-regions or points in space (e.g., similar to 300, 301, etc. in FIG. 1C). In essence, in accord with the concepts disclosed herein, the same general techniques are applicable not only to real property, but to structures as well, and to any surface (e.g., horizontal, inclined, vertical). Thus, the present concepts, in a broad sense, includes taking preexisting surveyed points in space (i.e., in some coordinate reference frame) and utilizing a navigation or positioning system (e.g., GPS) to cause at least one computer-controlled mechanism to perform work on or at those points (e.g., forming a graphic image thereon).

As to aspects of the present concepts where plants are planted to form a desired graphic, particularly for multi-hybrid systems, yield may be advantageously increased by further mapping (e.g., in the mapping step 420 in FIG. 3) at least one of measured soil characteristics and/or prior harvest data for each of the plurality of N points defining the graphic 250 (e.g., 300, 301 in FIG. 1C) and selecting and placing seeds (e.g., selecting hybrids) better adapted for the particular soil characteristics at each point.

As discussed above, the graphic 250 on real property 200 may utilize contrasting hybrids dispensed at pre-determined points (see, e.g., FIGS. 1B, 1C and points 300, 301). In yet additional aspects, the step of mapping (see, e.g., step 420 in FIG. 3) may advantageously comprise mapping field data and, using software, layering the graphic 250 over this field data, to model the effects of utilizing numerous hybrids to get both contrast as well as increased yield or the effects of planting a field multiple times. To illustrate the practical impact, if one were to plant two hybrids for yield, one hybrid (e.g., an "offensive hybrid") would be selected that would do well under good conditions (e.g., favorable sunlight, water, pest control, stress, etc.) and one hybrid (e.g., a "defensive hybrid") would do better under poor conditions (e.g., a variety that conserves resources and fares better under adverse conditions). Thus, each of the N points of sub-regions forming the graphic 250 may comprise two or more hybrids (e.g., two or four or more combinations of defensive and offensive hybrids) to provide not only potential enhancement to yield, but also to the viability of the graphic. A plurality of hybrids may be utilized to get both contrast as well as to increase yield of a crop by proper placement. The same effects can be achieved by planting a field several times (e.g., a layered application, etc.) if the equipment isn't capable of simultaneously handling the plurality of hybrids. In yet additional aspects, the step of mapping (see, e.g., step 420 in FIG. 3) may advantageously comprise mapping field data and, using software, layering the graphic 250 over this field data, to incorporate existing field characteristics (e.g., a treeline, body of water, rock outcropping) into the graphic such that the characteristic becomes a part of, or even enhances, the overall graphic.

In at least some aspects of the present concepts, plants could be manipulated to wither in the sun or wind, or any element that is generally predictable, to produce different images in order to get multiple images and possibly better target market at different times of the day to different viewers.

In at least some aspects of the present concepts, the elevation/curvature/contour of the portion of the real property corresponding to the graphic is factored into the acts that are implemented to form the graphic so that the graphic presents, to the intended vantage point(s), a non-distorted graphic. By way of illustration, if an area allocated to a graphic has a grade (rise/run×100) of 1 degrees and the graphic is to span a distance of 500 yards, the height of the plants across the grade are advantageously faded or decreased with increasing height of the surface of the real property so that distortion effects or visual defects (e.g., shadows, etc.) caused by height differentials are minimized or eliminated. The factoring of such surface features may comprise, for example, selection of different plant types having different heights at maturity, planting the same type of plants at different times (e.g., in stages) so that at a specific time frame over which the graphic is to be realized the plants varying growth stages yield a visually consistent graphic, or mechanical manipulation of the plants to equalize a height of the plants to a particular elevation.

In at least some aspects of the present concepts, circular irrigation rigs (or alternatively a highly specified irrigation array) with smart data could be used for manipulation, for instance to fertilize, to apply bots, or to chemically apply nutrients, water, seed, dye, paint and/or chemicals through a smart data system to manipulate seeds or plants to produce a graphic in accordance with known positions of the nozzles or outlets of each point in the irrigation rig or array.

In at least some aspects of the present concepts, sod land could be planted in order to create a graphic and obtain ad money, while still producing a crop of sod. For instance, multiple varieties could be planted, weather permitting, to produce a year-round graphic (e.g., advertisement). Sod may also be manipulated using any of the various forms referenced herein (e.g., harvesting) to create a graphic.

In at least some aspects of the present concepts, the plants can be manipulated to "dye" the earth different colors so that when the plants are removed, and before new plants are planted, the graphic will be visible.

In at least some aspects of the present concepts, a direction that a plant is planted can be selected to influence the graphic 250. For example, the visibility of or contrast of a graphic can be affected by the aerial viewing method's or viewer's vantage point (e.g., the graphic image has different characteristics, such as reflectivity or contrast, when viewed from a first direction (e.g., the direction it was planted) or from a second direction (e.g., against the direction or against the grain of the field)). These characteristics may be further influenced by the effects and directions of sunlight and the present concepts include utilization of the incident sunlight anticipated for particular times of year and particular times of day to optimize a visual presentation of a graphic 250.

In at least some aspects of the present concepts, the changing visual presentation of maturing plants could be placed to either mature into different images or they could be manipulated, at some point, mechanically or chemically, to convey different visual presentations of the graphic at different times or even to present different graphics at different times (e.g., modification of a first graphic to produce a second graphic substantively different than that of the first graphic). In practice this concept of changing a graphic or have it change on its own could be done by several means. In one aspect, seeds are planted so that at a certain growth stage 1 image is shown, and then, for instance, when the corn tassels, have the hybrids placed so that the tassels produce a second image. Stated differently, plants that contrast at different points in their life cycle can be placed to provide different graphics from the same plants at different times. In another aspect, plants are manipulated with chemicals, or mechanically, to create a graphic by essentially overwriting the original image. An example would be to create an original graphic and then go over the graphic with either chemicals, sprayers, harvesting equipment, cultivating equipment, bots, drones etc. to produce a second graphic. Essentially manipulating or deleting the original graphic in order to create another graphic through various means.

In accord with aspects of the present concepts, chemicals (applied externally, applied via plant uptake mechanisms, applied via bots, etc.) and/or mechanical work may be applied to plants (e.g., computer-controller mechanism(s), bots, etc.) to manipulate or alter the plants to achieve a desired contrast, which may be used to alter an image or create an image. By way of example, a graphic is defined, as described above, and signals sent to a plurality of bots to instruct each bot to move to occupy a specific spatial position (e.g., 2-D or 3-D) to form the graphic or each of the plurality of bots being programmed to move to occupy a specific spatial position. As another example, a graphic is defined, as described above, and signals sent to a plurality of bots to instruct each bot to move to occupy a specific spatial position and take a specific action or actions at the specific spatial position and optionally areas adjacent thereto to form the graphic or each of the plurality of bots being programmed to move to occupy a specific spatial position and take a specific action or actions at the specific spatial position and optionally areas adjacent thereto to form the graphic. In such aspects, the spatial position to be occupied by each bot may advantageously be communicated to each bot through one or more navigation systems (e.g., positional transponders, antenna, etc.) in one-way or two-way communication with each bot. In another aspect, the spatial position to be occupied by each bot may advantageously be communicated to each bot through at least one navigation system in one-way or two-way communication with at least one bot, with a plurality of the bots being oriented relative to other ones of the bots. As to the specific action or actions to be performed by one or more of the bots, the bot could, for example, be instructed to either mechanically disrupt certain processes of a plant in order to manipulate it, or deliver chemicals or nanobots to, predetermined places in order to produce the relevant portion of the graphic. Similarly, the specific action or actions to be performed by one or more of the bots could comprise planting, with the bot(s) transporting seeds to predetermined locations for planting by the bot(s), as well as cultivate by burrowing or could comprise reflecting light and emitting light in order to produce the relevant portion of the graphic. In at least some aspects, the bots are solar, thrive off vegetation, and/or battery powered.

According to some embodiments of the systems, methods, and other implementations described herein, a value or objective-based analysis may be conducted to, for example, maximize yield (or achieve an optimum of some other type of defined objective, such as minimizing cost). For example, multiple hybrids can be used to increase yield or performance based on factors such as soil type or quality. This is sometimes referred to as use of "offensive" and "defensive" hybrids. In some embodiments, a value analysis is conducted to determine relative values between creating a graphic (i.e., an aerially-viewable image) within the field and planting offensive and defensive hybrids without a graphic. Factors calculated into the analysis can include, for example, seed cost, fuel costs, labor costs, estimated yield, estimated cost at time of sale, estimated storage costs, and the like.

Thus, as noted herein, in some embodiments, formation of an aerially-viewable image may be derived using multi-hybrid (selecting, at a given location of a field, one of several available crops to plant) and/or variable rate (e.g., controlling the seed population/density planted in the soil) processing/techniques, while causing the eventual grown crops to approximate a target image selected at the time of planting (e.g. a company logo, an advertisement, a whimsical graphic, or any other type of aerially-viewable image). Such embodiments that combine variable rate techniques with multi-hybrid techniques may allow for a yield boost by placing a combination (i.e., a mosaic or hybrid) of seeds that do better in differing soil types in the preferred soil type for the purpose of increasing yield. In order to do this, a determination is made to find contrasting hybrids of a certain type, and contrasting hybrids of another type, in order to achieve the target image/graphic. Any number of combinations for desired results could be applied. If one were to vary the population of seed while doing so, they could possibly get the most efficiency from a field while getting an image. A seed could also be chosen to not only be the best contrasting, but in low population areas a plant could be chosen to canopy faster so that the image would look fuller while still utilizing variable rate techniques. Thus, as described below in greater detail, either variable rate techniques for cost saving of inputs (including fertilizer chemicals etc.), multi-hybrid for increased yields while getting an image, or both techniques (i.e., using multi-hybrid, and variable rate to get the benefits of both methods while forming the target image) may be used. Forming an image from grown crops using contrasting varieties that vary population for variable rate farming practices, and utilize more than one set of similar contrasting hybrids to maximize a soil's potential for yield increase, can be used to achieve a yield boost without negatively affecting an image. These prescriptions can be derived using hardware and software implementations that can accept as input the field data, the target image, environmental data, and all other germane information required to form the target aerially-viewable image while achieving other defined objectives (such as maximizing yield and/or minimizing costs). This has the advantage of being more efficient with variable rate farm practices as well as gaining an increase in yield utilizing multi hybrid technology.

Figure 4:
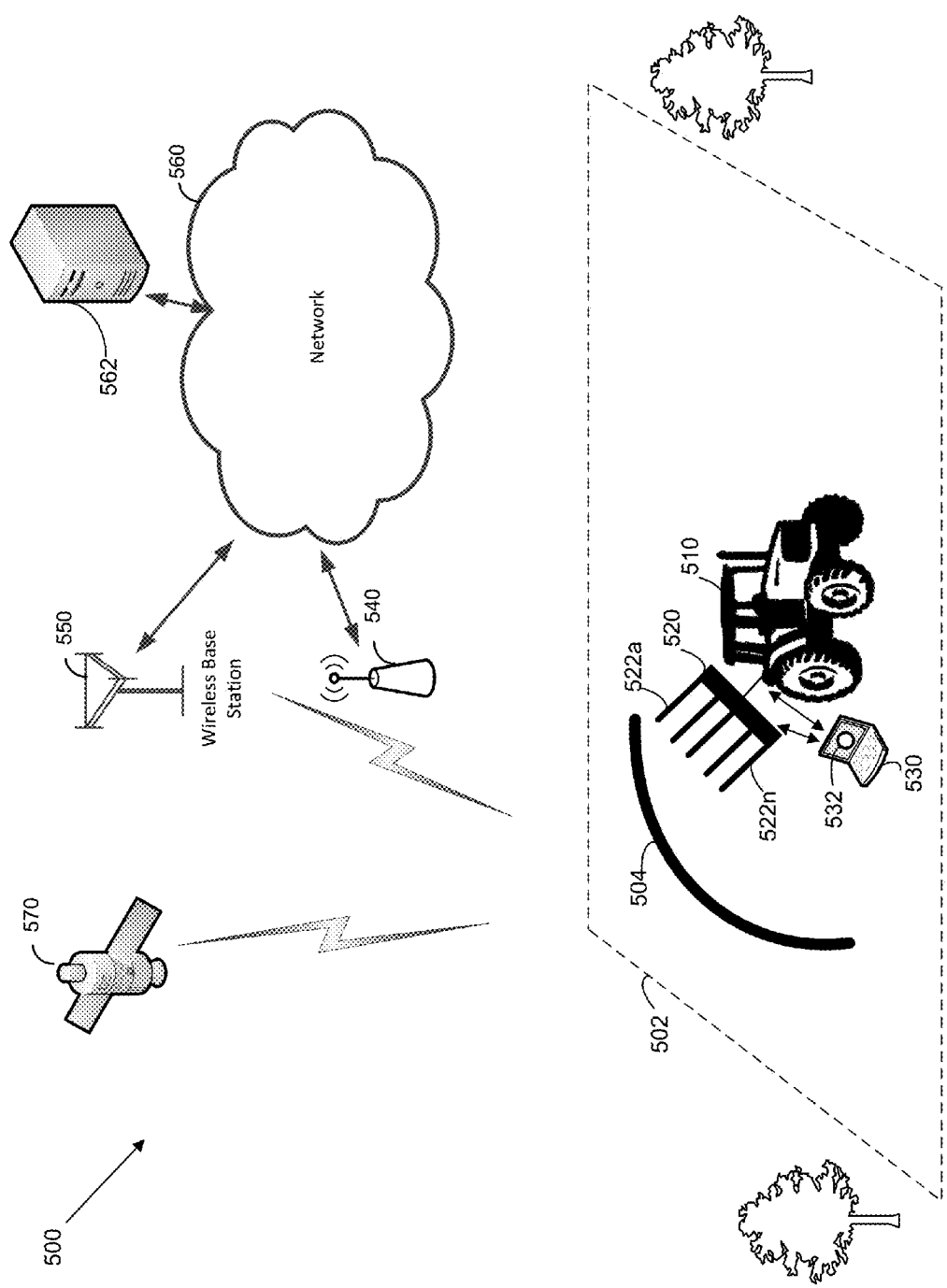
FIG. 4 is diagram of a system to form aerially-viewable images.

With reference to FIG. 4, a diagram of an example system 500, which may include some of the devices, components and elements depicted in FIG. 1-3 described herein, is shown. The system 500 includes a farming vehicle 510, such as a tractor (although any other vehicle configured to haul or pull other equipment may be used), pulling a multi-dispenser planter 520 that includes seed dispenser units 522a-n. The vehicle 510 and the planter 520 are depicted as processing a field 502. Each of the seed dispenser units 522a-n may be individually controlled, for example, by a controller 530 that is depicted as a computing device, but may be implemented as any type of processor or non-processor controller. The controller is illustrated as being situated proximate to the planter, but in some embodiments it may be housed within a housing unit of the planter 520, or may be situated remotely from planter 520 (e.g., within the cabin of the tractor 510, or at a remote server such as the server 562), in which case the controller communicates with the dispensing units via a wired or wireless connection. Although FIG. 4 depicts a planter, other types of machinery, including, for example, a spreader, seeder, tiller, plow, mulcher, mower, harrow, cultivator, subsoiler, sprayer, nozzle, and/or pulverizer, may be used in addition to or instead of the planter 520. Each of the dispensing units 522a-n may include an actuatable open/close mechanism (e.g., a valve) that opens and shuts off in response to control/actuation signals from, for example, a controller such as the controller 530. In some embodiments, at least some of the dispensing units 522a-n may include multiple hopper and meter set-ups run by electric motors that can vary rate or be completely stopped.

As noted, the control signals generated by the controller 530 are derived based on seed planting prescriptions incorporating variable rate and multi-hybrid techniques, a target image 532 (an approximation of which is to be formed in the field to be processed, as illustrated by the arc 504 which represented a portion of the field that is processed so that it would result in an aerially-viewable image approximation of a target image 532 shown on a screen of the controller 530), as well as based on location information derived based on RF signals and/or motion sensors signals that allow determination of the position of each of the multiple dispensing units attached to the vehicle 510 relative to the field to be processed. The controller 530 thus causes each of the dispensing units 522a-n to dispense a respective seed contained within a seed reservoir of the respective units at a rate determined for the particular field portions when the controller determines that the particular dispensing unit has reached that location.

Similar to the system depicted in FIG. 1A, in some embodiments, the controller 530 may also include one or more sensors, including, inertial sensors, such as an accelerometer, gyroscope, magnetometer, etc., environmental condition sensors (a barometer, which may be used to measure and/or derive altitude, thermometer), RF sensors (e.g., GNSS receiver to receiver satellite transmissions, e.g., from satellite vehicles such as the satellite vehicle 140 or the satellite vehicle 570 depicted in FIGS. 1A, and 4, respectively, based on which positioning operations may be performed, RF transceivers, configured to receive RF signals, such as WLAN signals, WWAN signal, near-field signals, etc.) In various implementations, at least some of the sensors that are used to obtain data based on which, at least partly, a determination is made for each of the dispensing units 522a-n as to whether, and at what rate, to cause/actuate the individual dispensers to dispense respective seeds. The controller 530 may also include a user interface to provide information about operations of the equipment.

Data to control actuation of the dispensing units of the planter 520, including the target image data with respect to which an aerially-viewable approximation is to be formed, field data (comprising, for example, soil attributes for individual portions/units of the field), environmental data, location-determination data, etc., may be received using one or more communication interfaces implemented on the controller 530. The controller 530 may be configure to communicate with any type of remote network node, including WLAN nodes, such as WLAN node 540, one or more WWAN nodes, such as the WWAN node 550, and so on. Any of the depicted devices and nodes of system 500 may be elements in various types of communications networks, including a wide area wireless network (WWAN), a wireless local area network (WLAN), a wireless personal area network (WPAN), and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A WLAN may include, for example, an IEEE 802.11x network. A WPAN may include, for example, a Bluetooth network (including one based on Bluetooth Low Energy protocol), an IEEE 802.15x, RDID-based networks, other near-field communication networks, etc. In some embodiments, 4G networks, Long Term Evolution ("LTE") networks, Advanced LTE networks, Ultra Mobile Broadband (UMB) networks, and all other types of cellular and/or wireless communications networks may also be implemented and used with the systems, methods, and other implementations described herein. While the example illustrated in FIG. 4 includes a single wireless base station and a single WLAN node, in other implementations the network environment or system illustrated in FIG. 1 may include more or fewer than the nodes 540 and/or 550 which have coverage areas that may overlap at least in part. In some embodiments, the system 500 may include no wireless base stations. In some variations, communication between any of the interfaces of the controller 530 and a remote system may be implemented based on any combination of the WWAN, WLAN and/or the WPAN described herein, as well as with wired communication.

The example system 500 of FIG. 4 may further include a server 562 (e.g., a location server, such as an Evolved Serving Mobile Location Center (E-SMLC) server, a remote vehicle control server to control the movement of vehicles and/or dispensing of plant seeds contained in equipment hauled by the vehicle, or any other type of server) configured to communicate, via a network 560 (which may be a packet-based network, such as the public Internet), or via wireless transceivers included with the server 562, with multiple network elements or nodes, and/or mobile wireless devices. For example, the server 562 may be configured to establish communication links with one or more of the nodes (e.g., the nodes 540 and 550 of FIG. 4), which may be part of the network 560, to communicate data and/or control signals to those nodes, and receive data and/or control signals from the nodes. Each of the nodes 540 and/or 550 can, in turn, establish communication links with the controller 530 if the controller is within range of the respective nodes. The server 562 may also be configured to communicate directly with the controller 530. In some embodiments, the server 550 may also be configured to perform some of the operations to cause seed dispensing resulting in an aerially-viewable image approximating a desired/target image.

Figure 5:
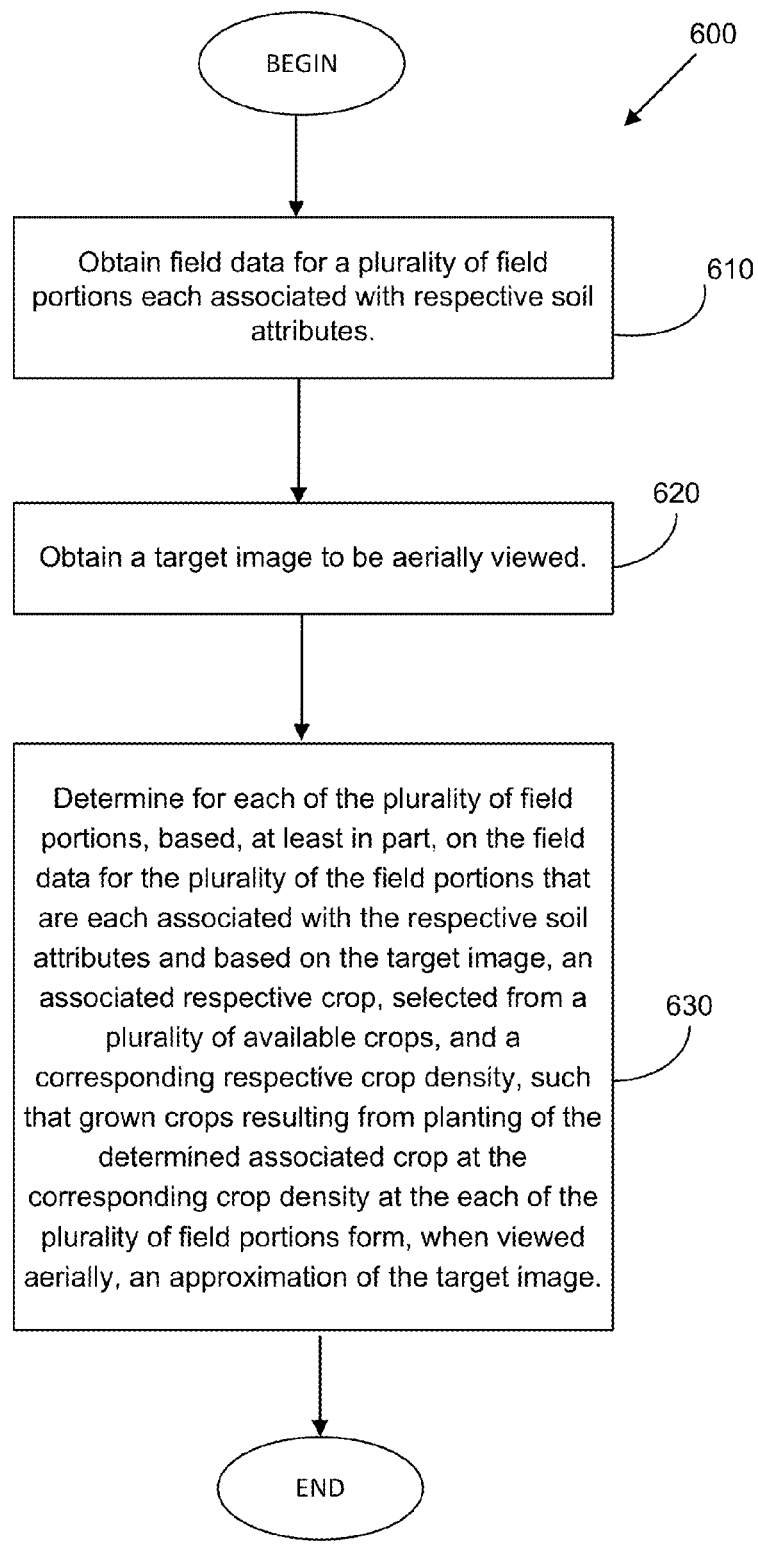
FIG. 5 is a flowchart of an example procedure to form an aerially-viewable image using variable-rate and multi-hybrid techniques.

With reference now to FIG. 5, a flowchart of an example procedure 600 to form an aerially-viewable image using variable-rate and multi-hybrid techniques. The procedure includes obtaining 610 field data for a plurality of field portions each associated with respective soil attributes. As noted, obtaining the field data may include receiving at a controller (such as the controller 530 of FIG. 4) the field data from some remote device (e.g., a remote server) that maintains that for the field to be processed. The controller may also be configured to collect field data (e.g., soil data, such soil acidity, soil moisture, soil composition, soil type, and/or all other field data discussed herein) from the equipment it is to control (e.g., the planter 520 of FIG. 4) as the equipment traverses the field. That collected data can then be transmitted to the remote device to augment existing data records, and may also be maintained at the controller and subsequently be used (as part of its historical record) to determine the crops and crop density. In embodiments in which the determination of the crops and respective density (population) values at various portions of the field are performed remotely from the controller, obtaining the field data may include retrieving, or otherwise procuring, the field data from a database maintained at the remote server, and/or receiving field data (specific to the field to be farmed, or other fields in the area of the particular field to be farmed, e.g., based on crowd-sourcing processes to collect data from multiple sources that may be relevant to the particular field). In addition to field data, other data that may be collected (and that may be used to determine crops and densities for the plurality of field portions to be farmed) includes environmental data, available crop data, equipment data, and so on.

The procedure 600 further includes obtaining 620 a target image to be aerially viewed. As noted, the target image may be a company logo, an advertisement, a notification, a whimsical graphic, or any other type of aerially-viewable image. As discussed herein (e.g., with respect to FIG. 3), various processing and filtering operation may be performed with respect to the obtained target image. For example, the target image obtained may be processed to scale it, or a portion of it, to a designated portion of the field. The scaling operation may include the selection of an appropriate scale for the graphic that would result in the formation (when the crops planted are grown, or immediately subsequent to the farming of the field) of an approximation of the target image when viewed from some intended altitude. Thus, the scale chosen, and thus the scaling processing (and crop and density determination) may be based, at least in part, on the intended altitude from which the field is to be viewed. For example, the scale selected for low-flying aircrafts may be different from the scale(s) chosen when the field is viewed from a different vantage point or altitude (e.g., by high flying aircraft, cameras, satellites, drones, balloons, or any other aerial object, passers-by on a nearby highway, and so on). In such embodiments, the procedure therefore includes scaling the target image based on dimensions associated with the plurality of field portions and a data representative of a vantage point from which the approximation of the target image is aerially viewable. Another example of a filtering operation that may be performed on the target image is to filter it to discrete shades or colors that correspond to available crops. For example, if the target image has portions illustrated in dark red and yellow, it may be necessary, depending on the available crop seeds, to map/assign those colors to the closest colors and shades corresponding to available crop seeds, different types of foliage, etc.

Figure 6:
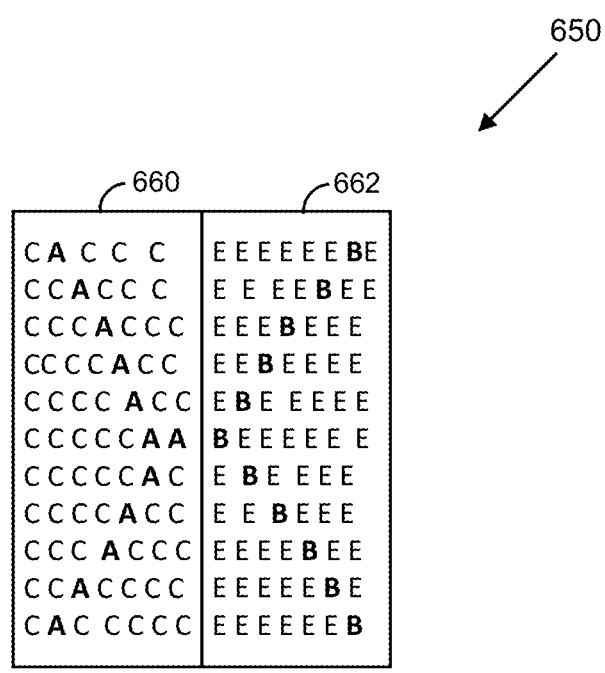
FIG. 6 is a diagram of a crop and density prescription for a field with two soil sections.

With continued reference to FIG. 5, having obtained field data (and/or other data), and having obtained the target image, for each of the plurality of field portions (which, as discussed, may be based on pre-determined area value or resolution) an associated respective crop, selected from a plurality of available crops (e.g., different species of corn, different types of grain, different types of sod, etc.) and a corresponding respective crop density (or population) are determined 630, based, at least in part, on the field data for the plurality of the field portions and based on the target image, such that grown crops resulting from planting of the determined associated crop at the corresponding crop density at the each of the plurality of field portions form, when viewed aerially, an approximation of the target image. For example, with reference to FIG. 6, an illustrative diagram of a crop and density prescription for a field 650 with two soil sections 660 and 662 (each corresponding to respective sets of soil attributes) is shown. Based on the soil attributes, the desired target image and the available crops (represented as A, B, C, and E), the pattern and density to plant the crop is derived so as to achieve an approximation of the desired target image (in this case, the symbol 'X') and/or some objective (maximizing yield). For example, the crop A may be a crop that is similar (in terms of visual contrasting and/or other visual properties) to crop B, but which may be used for different soil attributes in order to increase yield (while still achieving some particular image). Similarly, the crop C may represent a contrasting hybrid or plant that is similar, in terms of visual contrasting, to crop E, and which may be used to increase yield (for different soil attributes). As can be seen from FIG. 6, the crop are prescribed to be planted at different spacing/density, to achieve a variable rate placement (denoted $A_g$) for a particular soil optimization (e.g., to achieve increased yield or reduced input costs) and given the desired aerially viewable image (in this case, the symbol 'X').

In some embodiments, determining for the each of the plurality of field portions the associated respective crop and the corresponding respective crop density may include determining for the each of the plurality of field portions the associated respective crop and the corresponding respective crop density that maximize aggregate crop yield in the plurality of field portions, subject to a constraint that the grown crops form, when viewed aerially, the approximation of the target image. The determination of the crops to be selected and their respective density (i.e., the variable rate and multi-hybrid prescriptions to derive and implement for a particular target image) may be determined by using linear programming procedures. Generally, linear programming seeks to solve for some optimal (or near optimal) objective (such as maximum yield or minimal use of resources, in embodiments of forming aerially-viewable image approximations in a field) by defining one or more constraints (also referred to as requirements) that typically correspond to linear relationships. In the implementations described herein, one constraint that is used for finding the optimal solution is that the eventual growth of the crops to be selected (from the available crops, with such available crops associated with attributes such as species, color, size at maturity, and so), and the density in which the crops' seeds are sowed, need to form an approximation of the target image (at the appropriate scaling for the intended vantage point). The target image itself, as noted, may have been processed/filtered to assign the original colors of the image to discrete colors and shades that can be realized through the farming operations described herein. Other constraints that may be defined include constraints pertaining to available resources, including the available crops (and their respective attributes), field attributes (expressed for some pre-determined field area sizes), and environmental attributes. An objective function (e.g., yield, or resource utilization, profit) is defined by the constraints, including a constraint requiring grown crops to approximate (subject to some tolerance value) the target image initially obtained (e.g., at 620 of the procedure 600). Thus, in such embodiments, determining for the each of the plurality of field portions the associated respective crop and the corresponding respective crop density that maximize aggregate crop yield in the plurality of field portions, subject to the constraint that the grown crops form, when viewed aerially, the approximation of the target image may include defining one or more constraints based on one or more of, for example, the field data for the plurality of field portions, available crops, available farming materials, and/or environmental conditions. The determining further includes and performing a linear programming procedure to achieve a maximum aggregate crop yield based on the defined one or more constraints.

In some variations, determining for the each of the plurality of field portions the associated respective crop and the corresponding respective crop density may include defining one or more constraints based on one or more of, for example, the field data for the plurality of field portions, available crops, available farming materials, and/or environmental conditions, defining a further constraint that the grown crops form, when viewed aerially, the approximation of the target image, defining one or more objectives (e.g., yield maximization, resource, minimization), and performing a linear programming procedure to achieve the defined one or more objectives based on the defined one or more constraints.

In some variations, to reduce the computational complexity (or corresponding cost) that may be associated with determining crop selection and population using linear programming methodology (or other methodologies), and otherwise simplify the crop and density determination, other procedures to determine the crop selection and respective crop densities at each of the plurality of field portions may be used.

For example, in some embodiments, the problem of determining the crops to be selected and the respective densities for those crops (in respective field portions of the field to be farmed) can be broken into separate processes (e.g., solving simpler problems, one at a time). In an initial process, the density for each of the field portion may first be computed based, at least in part, on the field data. This initial determination may also be based on the target image that is to be approximated through the farming of the field. Having computed the crop densities at each of the field portions, the specific crops that are to be planted at each of the field portions may next be derived based on the already determined crop densities (this derivation may also be based on the target image to be approximated). Thus, in such embodiments, determining for the each of the plurality of field portions the associated respective crop and the corresponding respective crop density may include determining for the each of the plurality of field portions the respective crop density based, at least in part, on the field data, and deriving for the each of the plurality of field portions, based, at least in part, the determined respective crop density for the each of the plurality of field portions, the associated respective crop.

In some embodiments, the selection of crop and determination of respective crop density for each field or land portion may be facilitated by representing field data (e.g., soil attributes) as a field attribute map that can then be overlaid on a similar map representation of the target image. In such embodiments, user input, responsive to the resultant map representation (with the map-formatted target image overlaid on a map representation of the of the field data), may be provided to select at least some of the crops and/or densities at particular portions of the field. For example, a user may make an initial selection of crops for an important feature(s) of the target image (e.g., selecting a particular crop with a particular expected color, shade, and other growth attributes), and an automatic procedure (which may also be based on linear programming, or other processes) may be used to determine the crops and/or densities for the remaining areas of the land for which the user did not provide input.

Using the determined prescriptions for the crops and populations (densities) of seeds that are to be planted at the field, the field/land is processed to plant the seeds, For example, locations for one or more seed/crop dispensing units (e.g., such as the units 522a-n) are determined (based on one or more positioning/location-determination procedures, e.g., location determination procedures based on GPS and/or real-time kinematic (RTK) techniques), and the one or more seed dispensing units are actuated to cause dispensing of respective crop seeds held in the one or more crop dispensing units based on the determined respective crop and the corresponding respective crop density at particular ones or the plurality of field portions at which the one or more crop dispensing units are determined to be located. As noted, various types of crops may be used to form the approximation of the target image, including, for example, different types of corn crops (e.g., of different colors and shades), different types of grains (e.g., wheat), different types of grass/sod (each possibly with different shade and/or maturity period), etc. It is to be noted that due to different maturity/growth periods associated with different crops (e.g., with the different sod crops that may be planted), it may be required to implement pre-programmed harvesting. For example, when harvesting sod that was originally planted according to the original prescriptions derived (for variable rate and multi-hybrid processes), it may be necessary to avoid harvesting one type of sod that has not yet matured, while harvesting the already matured portions of sod. Therefore, in some realizations, the original prescriptions may be used by the harvesting equipment to automatically (according to location data derived via one or more location determination procedure used to determine the changing location of the harvesting equipment) to harvest the sod (or other crops) that already matured, while leaving intact the crops that have not yet matured. Those crops can subsequently be harvested at a later point.

Figure 7:
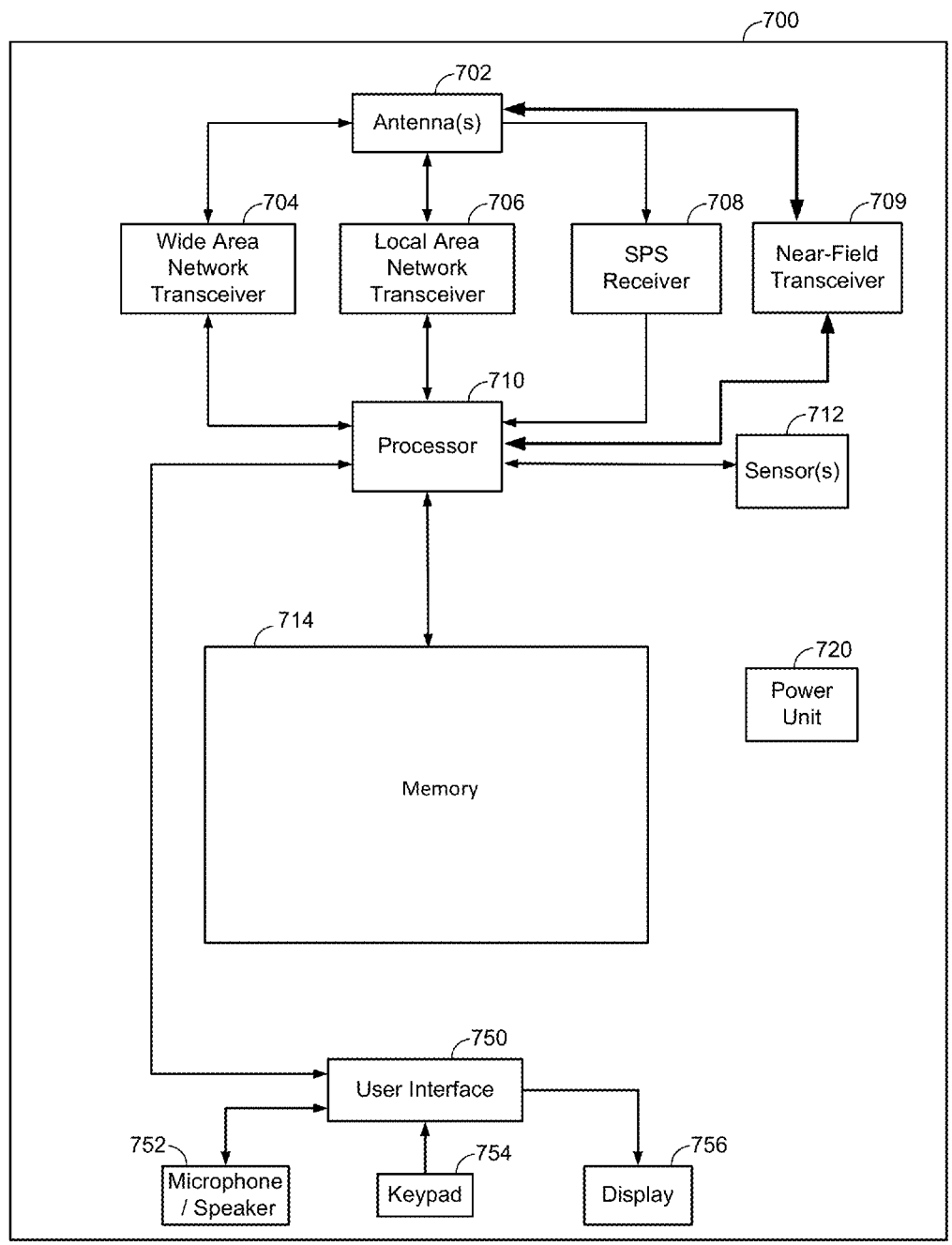
FIG. 7 is a schematic diagram of an example device that may be used in implementations of any of the devices of FIG. 1A and/or FIG. 4, including the implementation of the controller of FIG. 4.

With reference now to FIG. 7, a schematic diagram of an example device 700, which may be similar to, and be configured to have a functionality similar to that, of the controller 530 of FIG. 4, or of any other devices depicted in FIGS. 1A and 4, is shown. It is to be noted that one or more of the modules and/or functions illustrated in the example of FIG. 7 may be further subdivided, or two or more of the modules or functions illustrated in FIG. 7 may be combined.

Additionally, one or more of the modules or functions illustrated in FIG. 7 may be excluded. The device 700 may a mobile/portable wireless device (e.g. a smartphone or a laptop), or a stationary device (e.g., a server).

As shown, the example device 700 may include one or more transceivers (e.g., a LAN transceiver 706, a WLAN transceiver 704, a near-field transceiver 709, etc.) that may be connected to one or more antennas 702. The transceivers 704, and 706, and/or 709 may comprise suitable devices, hardware, and/or software for communicating with and/or detecting signals to/from a network or remote devices (such as devices/nodes depicted in FIGS. 1A and 4) and/or directly with other wireless devices within a network. In some embodiments, by way of example only, the transceiver 706 may support wireless LAN communication (e.g., WLAN, such as WiFi-based communications) to thus cause the device 700 to be part of a WLAN implemented as an IEEE 802.11x network. In some embodiments, the transceiver 704 may support the device 700 to communicate with one or more cellular access points (also referred to as a base station) used in implementations of Wide Area Network Wireless Access Points (WAN-WAP), which may be used for wireless voice and/or data communication.

As noted, in some variations, the device 700 may also include a near-field transceiver (interface) configured to allow the device 700 to communicate according to one or more near-field communication protocols, such as, for example, Ultra Wide Band, ZigBee, wireless USB, Bluetooth (classical Bluetooth), Bluetooth Low Energy (BLE) protocol, etc. As further illustrated in FIG. 7, in some embodiments, an SPS receiver 708 may also be included in the device 700. The SPS receiver 708 may be connected to the one or more antennas 702 for receiving satellite signals. The SPS receiver 708 may comprise any suitable hardware and/or software for receiving and processing SPS signals. The SPS receiver 708 may request information as appropriate from the other systems, and may perform the computations necessary to determine the device's 700 position using, in part, measurements obtained by any suitable SPS procedure.

Positioning information determined based on RF signals received by any of the communication interfaces of the device 700 may be used, for example, to determine the location and motion of the vehicle 510 of FIG. 4 (and thus of, for example, the units 522a-n which would be located at some fixed relative position distance from where the device 700 is determined to be located), and to therefore control actuation of, for example, seed dispensing units such as the units 522a-n illustrated in FIG. 4. As discussed herein, actuation of the seed dispensing units 522a-n may be based on the determined crop and density for each field portion (which are determined based at least on field data and a target image), and further based on the determined location of the seed dispensing units. The device 700 may derive positioning information based on signals communicated to and from access points (and/or base stations) by, for example, performing multilateration position determination procedures based on metrics derived from the communicated signals. Such metrics from which the device 700's position may be determined include, for example, timing measurements (using techniques based on round trip time, or RTT, measurements, observed-time-difference-of-arrival, or OTDOA, in which a device measures time differences in received signals from a plurality of network nodes, and so on), signal-strength measurements (e.g., received signal strength indication, or RSSI, measurements, which provide a representation of signal power level of a signal received by an antenna of the device), etc.

In some embodiments, one or more sensors 712 may be coupled to a processor 710 to provide data that includes relative movement and/or orientation information which is independent of motion data derived from signals received by, for example, the transceivers 704, 706, and/or 709, and the SPS receiver 708. By way of example but not limitation, the one or more sensors 712 may utilize an accelerometer (e.g., a MEMS device), a gyroscope, a geomagnetic sensor (e.g., a compass), and/or any other type of sensor. Moreover, sensor 712 may include a plurality of different types of devices and combine their outputs in order to provide motion information. The one or more sensors 712 may further include an altimeter (e.g., a barometric pressure altimeter), a thermometer (e.g., a thermistor), an audio sensor (e.g., a microphone), a camera or some other type of optical sensors (e.g., a charge-couple device (CCD)-type camera, a CMOS-based image sensor, etc., which may produce still or moving images that may be displayed on a user interface device, and that may be further used to determine an ambient level of illumination and/or information related to colors and existence and levels of UV and/or infra-red illumination), sensors to detect other environmental conditions, and/or other types of sensors.

The output of the one or more sensors 712 may provide additional data about the environment in which any of the devices/nodes of FIGS. 1A and 4 are located, and such data may also be used to perform control/actuation operations of the seed dispensing units 522a-n, or of other agricultural equipment (e.g., a harvester that may be activated in accordance with the determined location of the device 700 and the target image used for planting seeds or performing other farming operations).

The processor (also referred to as a controller) 710 may be connected to the transceivers 704, 706, and/or 709, the SPS receiver 708 and the one or more sensors 712. The processor may include one or more microprocessors, microcontrollers, and/or digital signal processors that provide processing functions, as well as other calculation and control functionality. Alternatively and/or additionally, in some embodiments, special purpose logic circuitry, e.g., an FPGA (field programmable gate array), an ASIC (application-specific integrated circuit), a DSP processor, etc., may be used in the implementation of the controller 710. The controller 710 may include an operating system, e.g., Windows XP® Microsoft Corporation operating system. The controller 710 may also include a memory 714 for storing data and software instructions for executing programmed functionality within the device. Such data and software instructions may include data and software instructions to implement any of the procedures/processes described herein, including the procedures and processes described in relation to FIGS. 1-6.

The example device 700 may further include a user interface 750 which provides any suitable interface systems, such as a microphone/speaker 752, a keypad 754, and a display 756 that allows user interaction with the device 700. The microphone/speaker 752 provides for voice communication functionality, the keypad 754 includes suitable buttons for user input, the display 756 includes any suitable display, such as, for example, a backlit LCD display, and may further include a touch screen display for additional user input modes. The microphone/speaker 752 may also include or be coupled to a speech synthesizer (e.g., a text-to-speech module) that can convert text data to audio speech so that the user can receive audio notifications. Such a speech synthesizer may be a separate module, or may be integrally coupled to the microphone/speaker 752 or to the controller 710 of the device of FIG. 7. The device 700 may also include a power unit 720 such as a battery and/or a power conversion module that receives and regulates power from an outside source. The power unit 720 is used to power the modules, units, and components of the device 700.

As noted, in some embodiments, formation of viewable images (from different vantage points, including aerial or terrestrial vantage points) may be achieved using a plurality of bots, or drones, that are controlled to move and occupy specific spatial positions. Communication to and from such a plurality of drones may be performed via individual communication modules on each of the plurality of drones, or via a central designated drone (configured to communicate through a long-range communication link, such as a WWAN-based link, established between the central drone and a remote node, such as the server 562 and/or the nodes 540 or 550 of FIG. 4), while the central drone communicates with the remaining drones via near-field communication links.

Figure 8:
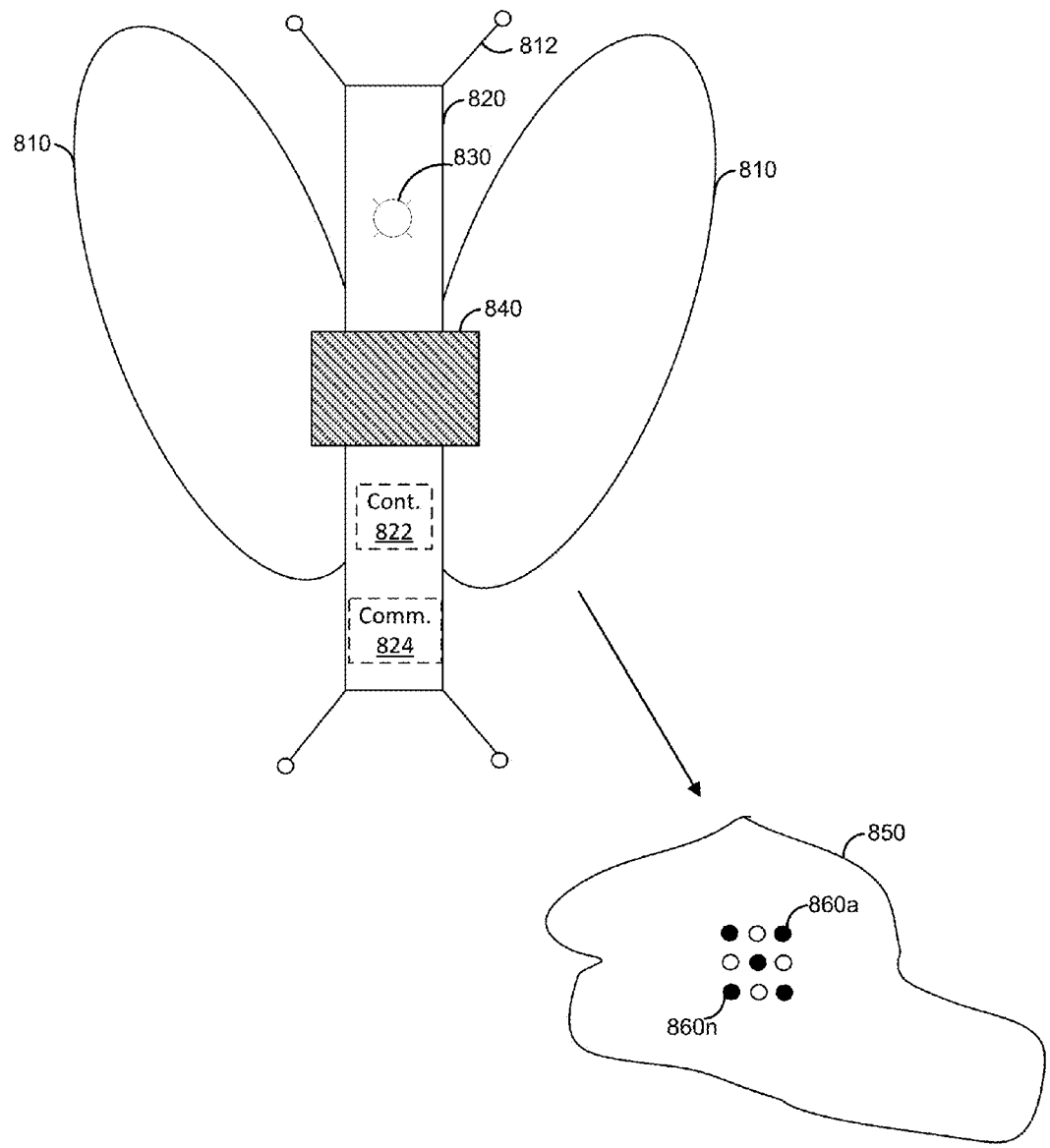
FIG. 8 is a diagram of an example implementation of a drone.

FIG. 8 is a bottom-view diagram of an example implementation of a possible drone, referred to as a SEAL (sea-air-land) drone 800 (also referred to as a bug-drone). The SEAL drone may be realized as a light-weight structure with a set of flapping (non-fixed) wings 810 extending from an elongated body 820 that may contain a controller 822 and a communication module 824 to communicate with a remote node and/or with neighboring SEAL drones. The controller 822 and the communication module 824 may be similar to the controller and communication modules/units depicted and discussed in relation to FIG. 7. The SEAL drone 800 may also include a set of legs or pods, such as the leg 812, configured to allow the drone to land and take off from multiple surfaces (liquid surfaced and/or solid surfaces). While located on a surface, the legs 812 may be actuated to cause locomotion of the drone 800 (effectively swimming if the drone 800 is located on a liquid-type surface, or crawling or walking if located on a solid-surface).

As further illustrated in FIG. 8, in some embodiments, attached to one surface of the body 820 of the drone 800 is a light source 830 that can be controlled (e.g., to an ON/OFF states, at different intensities and flashing frequencies) so as to, in combination with actuatable control of neighboring drones, form a pre-determined image that is viewable from a desired vantage point. Alternatively and/or additionally, in some embodiments, the drone 800 may include a screen 840 (e.g., LCD screen, or otherwise a screen from which images can be projected) attached to a surface of the body 820. The screen 840 may, like the light source 830, be actuatably controllable (e.g., based on signals transmitted from a remote location) so that, in combination with screen control for other drones that are spatially positioned according to some pattern relative to each other, form a viewable image (from some particular vantage point). As depicted in FIG. 8, the screen 840 may have dimensions such that it protrudes beyond the edges of the body 820. However, any dimension sizes for the screen 840 may be used. In some embodiments each screen may be configured to inter-lock with a neighboring screen of another neighboring drone to thus form a larger screen.

The drones, such as the SEAL drone 800 of FIG. 8, may be structured similarly to a water bug. This may be advantageous because such drones may be able to display an image on multiple differing surfaces efficiently. If such drones include interlocking screens, the drone may be arranged relative to each other, and on any surface, to form a resulting enlarged screen. Additionally, such drones may be configured to form a flat image (from a viewer's perspective) on uneven surfaces by computing and correcting for curvature. In some embodiments, the drones' screens (such as the screen 840 depicted in FIG. 8) may be flexible screens, in order to create a continuous screen that is compact during movement. As noted, drones may be controlled remotely via a device that includes a voice-control interface, or any other type of interface to accept instructions and input to control the positions of the drones and the light or image projections emanating from the drones (via their light sources or screens). In some embodiments, one or more drones could be utilized to power the image-forming drones. They could either be battery-based drones configured to define a frame around the image-forming drones, or attach to available power sources through a tag line of either an actual cable, or a linking of drones to form this line. The screens could connect in order to share this power as well, though a separate power link among the drones may also be used. These power-drones could get power from house outlets, directly from an electric line, and/or remotely from an electromagnetic field from for instance a high voltage power line (e.g., via power harvesting modules, or otherwise achieve wireless power transfer through various means). There could also be special drones to transform power by either attaching or being close to magnetic fields, as well as drones with photovoltaic cells (to generate solar-based power).

Thus, in some embodiments, multiple drones are configured to move (e.g., fly) into a position and attach themselves to a surface, or crawl/swim/float, to create an image by either reflecting, absorbing, or emitting light. This would have the benefit of using less energy (creating a longer lasting image, more energy efficient), and creating a much faster set up time than if the drones simply floated or crawled into position. The drones would not have to hover, which consumes a lot of energy. They also would not have to crawl or swim into position. In some embodiments, the drones are configured to make positional adjustments based on inertial sensors (similar to those discussed in relation to FIG. 7) and/or input about environmental conditions and/or positions of other neighboring drones. The location and light manipulation behavior of the drones is based on the target image that the multiple drones, when arranged relative to each other, are configured to approximate. Processing and filtering operations for the target image may thus be similar to the processing/filtering operations discussed in relation to FIGS. 3 and 6, and may include operations to scale an image to the expected dimensions of the arrangement of drones, the expected location of the arrangement of drones and the expected vantage point of the viewer (that will be viewing the resultant viewable image approximating the desired image), etc. For example, in the example of FIG. 8, nine (9) individual drones 860*a-n*, that each may be similar to the drone 800, may be controlled to move and land in a pond 850 and form a 3×3 drone array-arrangement. Subsequently, some of the drones may be controlled to turn on their light sources (or to otherwise manipulate light) so that a resultant image (e.g., an image of 'X') is formed and can be viewed from some pre-determined vantage point (e.g., aerial vantage point).

In some embodiments, the drones may be configured to implement learning behavior (or otherwise implement artificial intelligence) to allow them to decide where to go in order to create a desired image or advertisement in a collective, preprogrammed data, or use a space/time/location device (e.g., a navigation module). The multiple drones may also be configured to coordinate to manipulate light in order to create another image without moving. For example, the drones could either turn off or turn on light of desired wavelength in order to create an image that resembles either a changing billboard, or even a motion picture. Such drones could in essence land on a surface, attach themselves to desired positions on the surface, then display an image, multiple images, or even a motion picture. Such implementations could be deployed in various venues, including, without limitation at a cruise ship. In some embodiments, the drones could be positioned so as to define an artificial landscape.

Thus, in some implementations, a system is provided that includes a plurality of drones, and one or more processor-based devices to control the plurality of drones, the one or more processor-based devices configured to obtain a target image to be viewed from a pre-determined vantage point, and determine for each of the plurality of drones, based, at least in part, on the target image, a spatial position to place the each of the plurality of drones, and light behavior for light emitted from the each of the plurality of drones, such that a collective light behavior of a resulting arrangement of the plurality of drones forms, when viewed from the pre-determined vantage point, an approximation of the target image.

In further embodiments, implementations for creating graphics on landscapes using a drone (either flying or land based) with an attached paint sprayer is provided. The drone could use a location-determination device and a preprogrammed set of data points to paint landscapes by going back and forth, or concentrate in a certain area. The drone could be outfitted with various nozzles. An option would be to paint multiple colors at once, or simply utilize one single color, and layer differing colors by painting an object multiple times. Additionally, the nozzles could rotate or adjust the fan of spray in order to further achieve fine details. These implementations could be used to paint everything from equipment, to buildings, to billboards. Thus, data points are entered to allow the drone to perform the painting operation with the paint material(s) that was provided. For moveable equipment, a particular point on the machine could be designated as the reference point.

In some embodiments, painting a surface could be achieved using a single paint sprayer without having to use multiple nozzle/paint sprayers. A paint-sprayer system may be attached to the back of a tractor, or some other machine, with the sprayer pulled like a cart. The attached paint sprayer/nozzle may determine its position via on-boards sensors and/or a location-determination device, and communicate its position back to a central computer-based system (e.g., located at the tractor) to facilitate control of the movement of the tractor (either via a worm gear, a hydraulic cylinder, or some other mechanical means). In some embodiments, multiple nozzles could be placed on the same sliding apparatus in order to get multiple colors painted at once. The computer-based system could be configured to communicate with each nozzle, so that they would fire when in their correct positions. The computer-based system could control either one or multiple colors at once. These nozzles could either be on the same moving apparatus "block" and fired when needed. Alternatively, several sliding apparatus could be set up for each color. The nozzles could also turn on their axis in order to hit tight points such as, for instance, in a triangle. This may be necessary since most paint sprayers spray in a fan formation. By turning the fan sideways, where needed, or when the computer-based system directs the spray nozzle(s) to do so, certain fine details in tight places could be completed. Essentially, a 4-inch wide band, will narrow to 1 cm, etc. The computer-based system can be programmed to compensate, and to correct position/orientation of the nozzle to achieve this. The nozzle could spin, or otherwise be manipulated, in order to achieve different paint resolutions. The computer-based system could also instruct the entire tractor to move in order to further aid achieving fine details. If the nozzle at its narrowest is not in the correct centered place, then the entire apparatus, tractor and all, could make fine adjustments in order to fill-in this fine detail. The tractor or apparatus could also be computer-controlled to back-up or go forward in order to fill in missed areas, and complete fine details where necessary. Learning machines (artificial intelligence) may be used to aid in performance of computations to control the nozzle(s) or the tractor/apparatus to which the nozzle(s) is/are attached. In some embodiments, the tractor/machine to which the nozzle(s) is attached may be implemented using crab steering, conventional steering, all wheel steering, or any other steering mechanism to allow movement to achieve fine-adjustments.

In some embodiments, implementations for creating sculptures are disclosed. A robot or drone could be programmed to cut, paste, weld, etc., a structure that resembles a sculpture. This could be done with plants, snow, sand, rock, clay or any other material that can be sculpted. In such embodiments, a set of points may be loaded into a robot/machine, which together with positioning data (provided by a location-determination device) may be used to make a sculpture. A computer-based system would instruct a robot (drone) or machine where to cut, paste, bend or weld a certain structure in order to make a sculpture or 3D graphic. Multiple plants could also be used to create these sculptures. By using machine learning (artificial intelligence) systems, commands to build these sculptures can be generated to control the sculpting apparatus.

It is to be understood that the present concepts are not limited to the particular embodiments described above. While the disclosure has been described with reference to specific illustrative embodiments, modifications and variations of the disclosure may be constructed without departing from the scope of the disclosure. Each of the embodiments disclosed herein, and obvious variations thereof, inclusive of any combination of elements disclosed herein whether or not such combinations are expressly disclosed in combination, is contemplated as falling within the spirit and scope of the claimed disclosure, which is set forth in the following claims.

Although particular embodiments have been disclosed herein in detail, this has been done by way of example for purposes of illustration only, and is not intended to be limiting with respect to the scope of the appended claims, which follow. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method comprising:
    obtaining field data for a plurality of field portions each associated with respective soil attributes;
    obtaining a target image to be aerially viewed; and
    determining for each of the plurality of field portions, based, at least in part, on the field data for the plurality of the field portions that are each associated with the respective soil attributes and based on the target image, an associated respective crop, selected from a plurality of available crops, and a corresponding respective crop density, such that grown crops resulting from planting of the determined associated crop at the corresponding crop density at the each of the plurality of field portions form, when viewed aerially, an approximation of the target image, wherein determining for the each of the plurality of field portions the associated respective crop and the corresponding respective crop density comprises:

defining one or more constraints based on one or more of: the field data for the plurality of field portions, available crops, available farming materials, or environmental conditions;

defining a further constraint that the grown crops form, when viewed aerially, the approximation of the target image;

defining one or more objectives; and performing a linear programming procedure to achieve the defined one or more objectives subject to the defined one or more constraints.

2. The method of claim 1, wherein defining the one or more objectives comprises defining an objective to maximize aggregate crop yield, and wherein performing the linear programming procedure to achieve the defined one or more objectives subject to the defined one or more constraints comprises:

determining for the each of the plurality of field portions the associated respective crop and the corresponding respective crop density that maximize the aggregate crop yield in the plurality of field portions, subject to a constraint that the grown crops form, when viewed aerially, the approximation of the target image.

3. The method of claim 1, wherein determining for the each of the plurality of field portions the associated respective crop and the corresponding respective crop density comprises:

determining for the each of the plurality of field portions the respective crop density based, at least in part, on the field data; and deriving for the each of the plurality of field portions, based, at least in part, the determined respective crop density for the each of the plurality of field portions, the associated respective crop.

4. The method of claim 1, further comprising:

scaling the target image based on dimensions associated with the plurality of field portions and a data representative of a vantage point from which the approximation of the target image is aerially viewable.

5. The method of claim 1, further comprising:

determining locations for one or more seed dispensing units; and actuating the one or more seed dispensing units to cause dispensing of respective crop seeds held in the one or more crop dispensing units based on the determined respective crop and the corresponding respective crop density at particular ones of the plurality of field portions at which the one or more crop dispensing units are determined to be located.

6. A method comprising:

obtaining field data for a plurality of field portions each associated with respective soil attributes;

obtaining a target image to be aerially viewed; and determining for each of the plurality of field portions, based, at least in part, on the field data for the plurality of the field portions that are each associated with the respective soil attributes and based on the target image, an associated respective crop, selected from a plurality of available crops, and a corresponding respective crop density, such that grown crops resulting from planting of the determined associated crop at the corresponding crop density at the each of the plurality of field portions form, when viewed aerially, an approximation of the target image, wherein determining for the each of the plurality of field portions the associated respective crop and the corresponding respective crop density comprises:

determining for the each of the plurality of field portions the associated respective crop and the corresponding respective crop density that maximize aggregate crop yield in the plurality of field portions, subject to a constraint that the grown crops form, when viewed aerially, the approximation of the target image, wherein determining the associated respective crop and the corresponding respective crop density includes:

defining one or more constraints based on one or more of: the field data for the plurality of field portions, available crops, available farming materials, or environmental conditions; and performing a linear programming procedure to achieve a maximum aggregate crop yield based on the defined one or more constraints.

7. The method of claim 6, wherein determining for the each of the plurality of field portions the associated respective crop and the corresponding respective crop density comprises:

determining for the each of the plurality of field portions the respective crop density based, at least in part, on the field data; and deriving for the each of the plurality of field portions, based, at least in part, the determined respective crop density for the each of the plurality of field portions, the associated respective crop.

8. The method of claim 6, further comprising:

scaling the target image based on dimensions associated with the plurality of field portions and data representative of a vantage point from which the approximation of the target image is aerially viewable.

9. The method of claim 6, further comprising:

determining locations for one or more seed dispensing units; and actuating the one or more seed dispensing units to cause dispensing of respective crop seeds held in the one or more crop dispensing units based on the determined respective crop and the corresponding respective crop density at particular ones of the plurality of field portions at which the one or more crop dispensing units are determined to be located.

10. A method comprising:

obtaining field data for a plurality of field portions each associated with respective soil attributes;

obtaining a target image to be aerially viewed; and determining for each of the plurality of field portions, based, at least in part, on the field data for the plurality of the field portions that are each associated with the respective soil attributes and based on the target image, an associated respective crop, selected from a plurality of available crops, and a corresponding respective crop density, such that grown crops resulting from planting of the determined associated crop at the corresponding crop density at the each of the plurality of field portions form, when viewed aerially, an approximation of the target image, wherein determining for the each of the plurality of field portions the associated respective crop and the corresponding respective crop density comprises:

defining one or more constraints based on one or more of: the field data for the plurality of field portions, available crops, available farming materials, or environmental conditions;

defining a further constraint that the grown crops form, when viewed aerially, the approximation of the target image;

defining one or more objectives; and determining for the each of the plurality of field portions the associated respective crop and the corresponding respective crop density that achieve the defined one or more objectives subject to the defined one or more constraints and subject to the further constrain that the grown crops form, when viewed aerially, the approximation of the target image.

11. The method of claim 10, wherein the one or more objectives comprise at least one of: crop yield maximization, profit maximization, cost minimization, or resource-use minimization.

12. The method of claim 10, wherein determining for the each of the plurality of field portions the associated respective crop and the corresponding respective crop density comprises:

determining for the each of the plurality of field portions the respective crop density based, at least in part, on the field data; and deriving for the each of the plurality of field portions, based, at least in part, the determined respective crop density for the each of the plurality of field portions, the associated respective crop.

13. The method of claim 10, further comprising:

scaling the target image based on dimensions associated with the plurality of field portions and data representative of a vantage point from which the approximation of the target image is aerially viewable.

14. The method of claim 10, further comprising:

determining locations for one or more seed dispensing units; and actuating the one or more seed dispensing units to cause dispensing of respective crop seeds held in the one or more crop dispensing units based on the determined respective crop and the corresponding respective crop density at particular ones of the plurality of field portions at which the one or more crop dispensing units are determined to be located.

* * * * *